United States Patent
Ohnishi et al.

(10) Patent No.: US 10,001,311 B2
(45) Date of Patent: Jun. 19, 2018

(54) SIMPLE INVERTER-CONTROL-TYPE REFRIGERATOR, INVERTER CONTROL UNIT FOR REFRIGERATOR, AND INVERTER COMPRESSOR USING SAME

(71) Applicant: Panasonic Intellectual Property Management Co., Ltd., Osaka-shi, Osaka (JP)

(72) Inventors: Kenji Ohnishi, Shiga (JP); Hiroaki Kase, Shiga (JP); Mitsuhiro Fukuda, Shiga (JP); Masaki Sumi, Kyoto (JP); Katsumi Endou, Shiga (JP); Shigetomi Tokunaga, Shiga (JP)

(73) Assignee: PANASONIC CORPORATION, Osaka (JP)

( * ) Notice: Subject to any disclaimer, the term of this patent is extended or adjusted under 35 U.S.C. 154(b) by 0 days. days.

(21) Appl. No.: 15/120,964

(22) PCT Filed: Dec. 22, 2015

(86) PCT No.: PCT/JP2015/006385
§ 371 (c)(1),
(2) Date: Aug. 23, 2016

(87) PCT Pub. No.: WO2016/103678
PCT Pub. Date: Jun. 30, 2016

(65) Prior Publication Data
US 2016/0363361 A1    Dec. 15, 2016

(30) Foreign Application Priority Data
Dec. 24, 2014    (JP) .................................. 2014-259876

(51) Int. Cl.
*F25B 1/00*    (2006.01)
*F25B 49/00*    (2006.01)
(Continued)

(52) U.S. Cl.
CPC .......... *F25B 49/022* (2013.01); *F04B 39/023* (2013.01); *F04B 49/065* (2013.01);
(Continued)

(58) Field of Classification Search
CPC ............ F25B 49/025; F25B 2313/0293; F25B 2500/19; F25B 2600/02; F25B 2600/021;
(Continued)

(56) References Cited

U.S. PATENT DOCUMENTS

| | | | |
|---|---|---|---|
| 5,263,335 A | 11/1993 | Isono et al. | |
| 2009/0007575 A1* | 1/2009 | Kaga | F25B 49/02 62/126 |
| 2009/0255278 A1* | 10/2009 | Taras | F25B 49/025 62/115 |

FOREIGN PATENT DOCUMENTS

| | | |
|---|---|---|
| JP | 62-132384 U | 8/1987 |
| JP | 5-099484 | 4/1993 |

(Continued)

OTHER PUBLICATIONS

Takada, Controller for Air Conditioner, May 12, 2000, JP2000130824A, Whole Document.*

*Primary Examiner* — Larry Furdge
(74) *Attorney, Agent, or Firm* — Hamre, Schumann, Mueller & Larson, P.C.

(57) ABSTRACT

A simple inverter-controlled refrigerator includes temperature detector (17), constant speed main body control unit (12) whose power is turned on/off by temperature detector (17), and that can drive a constant speed compressor, inverter control unit (14) that is connected to constant speed main body control unit (12), and that is operated, based on a power on/off signal of constant speed main body control unit (12). And variable speed compressor (8) that is connected to inverter control unit (14), and that is controlled, based on an output from inverter control unit (14). Inverter (Continued)

control unit (14) has rotation speed setting unit (23) which is operated, based on the power on/off signal of constant speed main body control unit (12), and which is configured to set a rotation speed of variable speed compressor (8), and inverter drive circuit unit (24) which drives variable speed compressor (8) at the rotation speed set by rotation speed setting unit (23).

24 Claims, 12 Drawing Sheets

(51) Int. Cl.
*F25B 49/02* (2006.01)
*F04B 39/02* (2006.01)
*F04B 49/06* (2006.01)
*F04C 28/08* (2006.01)
*F25D 17/06* (2006.01)

(52) U.S. Cl.
CPC .... *F25B 49/025* (2013.01); *F04B 2203/0209* (2013.01); *F04B 2207/03* (2013.01); *F04C 28/08* (2013.01); *F04C 2240/403* (2013.01); *F25B 2500/19* (2013.01); *F25B 2600/021* (2013.01); *F25B 2600/025* (2013.01); *F25B 2600/0253* (2013.01); *F25B 2600/112* (2013.01); *F25B 2700/21* (2013.01); *F25D 17/065* (2013.01); *F25D 2700/12* (2013.01); *Y02B 30/741* (2013.01)

(58) Field of Classification Search
CPC .............. F25B 2600/24; F25B 2600/25; F25B 2600/0251; F25B 2600/0252; F25B 2600/0253; F25B 2600/11; F25B 2600/112; F25B 2700/171; F25B 2700/173
See application file for complete search history.

(56) References Cited

FOREIGN PATENT DOCUMENTS

| | | | |
|---|---|---|---|
| JP | 2000130824 A | * | 5/2000 |
| JP | 2000-333365 | | 11/2000 |
| JP | 2000-356447 | | 12/2000 |
| JP | 2006-343034 | | 12/2006 |

* cited by examiner

SIMPLE INVERTER-CONTROL-TYPE REFRIGERATOR, INVERTER CONTROL UNIT FOR REFRIGERATOR, AND INVERTER COMPRESSOR USING SAME

TECHNICAL FIELD

The present invention relates to a simple inverter-controlled refrigerator, a refrigerator inverter control unit, and an inverter compressor using the same.

BACKGROUND ART

In general, a refrigerator is mainly divided into two types such as a constant speed refrigerator which performs cooling by turning on or off a compressor and an inverter-controlled refrigerator which performs cooling by an inverter varying speed of the compressor. In these days while energy saving is strongly demanded, the inverter-controlled refrigerator is mostly used. In contrast, some countries strongly demand the constant speed refrigerator which can be provided at low cost.

However, these countries which strongly demand the constant speed refrigerator are also increasingly aware of power saving. Accordingly, there is a gradually increased demand for the inverter-controlled refrigerator having excellent energy saving efficiency.

The inverter-controlled refrigerator is much more expensive than the constant speed refrigerator. Accordingly, whether or not the inverter-controlled refrigerator is popularly distributed depends on how an inexpensive refrigerator can be provided, and further depends on how frequently and quickly the inverter-controlled refrigerator can be provided in response to a demand situation.

Therefore, the present applicant has progressively studied a method in which the constant speed refrigerator is utilized so as to function as a simple inverter-controlled refrigerator.

The present applicant has already proposed that a main body control unit of the constant speed refrigerator is replaced with an inverter control unit which can perform variable speed control on the compressor by inputting only a temperature signal from a thermistor so as to function as the inverter-controlled refrigerator (for example, refer to PTL 1).

FIG. 13 is a view illustrating a configuration of a refrigerator in the related art disclosed in PTL 1.

The refrigerator includes main body control unit 101. A temperature signal is input to main body control unit 101 from thermistor 103 disposed in storage 102. Main body control unit 101 is an inverter control unit which variably controls a rotation speed of compressor 104, based on the temperature signal, specifically, a time change or a temperature change. Main body control unit 101 (hereinafter, referred to as an inverter main body control unit) having an inverter system as described above controls compressor 104 and each component such as cooling fan 105 for circulating cool air and condenser fan 106.

Instead of the constant speed main body control unit which controls the compressor and the cooling fan to be turned on or off by using a thermostat, the refrigerator configured in this way in the related art has inverter main body control unit 101 which can perform variable speed control on compressor 104 by inputting the temperature signal from thermistor 103. In this manner, the refrigerator functions as the inverter-controlled refrigerator.

According to the refrigerator disclosed in PTL 1, it is not necessary to install a complicated electronic circuit for processing an operation status of a freezing system. Therefore, there is an advantage in that the refrigerator functioning as the inverter-controlled refrigerator can be provided at low cost.

However, according to the configuration disclosed in PTL 1, when the refrigerator functions as the inverter-controlled refrigerator, inverter main body control unit 101 which variably controls the rotation speed of the compressor by using the temperature signal from the thermistor has to be newly developed and designed as the main body control unit of the refrigerator, thereby causing work to be carried out in order to attach inverter main body control unit 101 to a refrigerator main body as the main body control unit.

That is, a refrigerator manufacturer side has to newly perform a development step of controlling a huge inverter main body and a complicated assembly step of attaching the main body control unit, thereby requiring time and effort. Consequently, there is a problem in that the inverter-controlled refrigerator is less likely to be provided frequently and quickly.

Particularly when the refrigerator is assembled, inverter main body control unit 101 and thermistor 103 are newly attached and connected to each other using a lead wire. Furthermore, it becomes necessary to connect inverter main body control unit 101 to each component such as cooling fan 105 and condenser fan 106. In this way, the refrigerator manufacturer needs to perform a lot of steps, and the refrigerator manufacturer cannot easily manufacture the inverter-controlled refrigerator. Accordingly, there is a problem to be solved in order to enable the refrigerator manufacturer to frequently and quickly supply the inverter-controlled refrigerator.

Even if a function of the inverter-controlled refrigerator is realized in this way, for example, the compressor has different rotation speeds at which the efficiency of the compressor for each compression capacity is optimized. Accordingly, in some cases, the rotation speed set by the inverter based on an output of the thermistor is not always the rotation speed which can optimize the efficiency of the compressor. Therefore, there is also a problem in that an energy saving benefit obtained by the inverter system cannot sufficiently be utilized.

CITATION LIST

Patent Literature

PTL 1: Japanese Patent Unexamined Publication No. 2000-356447

SUMMARY OF THE INVENTION

The present invention is made in view of a new task of frequently and quickly supplying an inverter-controlled refrigerator. Specifically, the present invention aims to provide a simple inverter-controlled refrigerator, a refrigerator inverter control unit, and an inverter compressor using the same, in which a function of an inverter-controlled refrigerator can easily be realized without requiring time and effort.

According to the present invention, there is provided a simple inverter-controlled refrigerator including a temperature detector, a constant speed main body control unit whose power is turned on/off by the temperature detector, and that can drive a constant speed compressor. An inverter control unit that is connected to the constant speed main body control unit, and that is operated, based on a power on/off signal of the constant speed main body control unit, and a variable speed compressor that is connected to the inverter control unit, and that is controlled, based on an output from the inverter control unit. The inverter control unit has a rotation speed setting unit which is operated, based on the power on/off signal of the constant speed main body control unit, and which is configured to set a rotation speed of the variable speed compressor, and an inverter drive circuit unit which drives the variable speed compressor at the rotation speed set by the rotation speed setting unit. The constant speed main body control unit and the inverter control unit are configured to function as an individually independent unit. The inverter control unit which is separate from and independent of the constant speed main body control unit is connected to the constant speed main body control unit.

According to the present invention, there is provided a refrigerator inverter control unit including a power on/off detection circuit, a rotation speed setting unit that is configured to set a rotation speed, based on a power on/off signal from the power on/off detection circuit, and an inverter drive circuit unit that drives a variable speed compressor at the rotation speed set by the rotation speed setting unit. The power on/off detection circuit, the rotation speed setting unit, and the inverter drive circuit unit are configured to function as one unit, are operated when the power on/off detection circuit detects a power-on time, and are configured to drive the variable speed compressor at the rotation speed set by the rotation speed setting unit.

According to the present invention, there is provided an inverter compressor configured so that the refrigerator inverter control unit is integrated with the variable speed compressor.

In this manner, the inverter control unit and the variable speed compressor are simply incorporated into the constant speed refrigerator including the constant speed main body control unit which controls the constant speed compressor to be turned on/off using the temperature detector so that the constant speed refrigerator can function as the simple inverter-controlled refrigerator. Moreover, in this case, without a need to replace the main body control unit with the inverter control unit on the refrigerator main body side, it is possible to provide the inverter-controlled refrigerator for a refrigerator manufacturer side without requiring much trouble. That is, the inverter control unit and the variable speed compressor in which the rotation speed setting unit and the inverter drive circuit unit are configured to function as one unit, or the inverter compressor in which both of these are assembled to each other are incorporated as a component on a refrigerator manufacturer side. In this simple manner, the constant speed refrigerator can function as the simple inverter-controlled refrigerator. Therefore, it is possible to frequently and quickly provide the simple inverter-controlled refrigerator in response to a demand situation.

According to the present invention, it is possible to easily manufacture an inverter-controlled refrigerator, and it is possible to provide an inexpensive simple inverter-controlled refrigerator which can frequently and quickly be manufactured in response to a demand situation.

DESCRIPTION OF EMBODIMENTS

Hereinafter, exemplary embodiments according to the present invention will be described with reference to the drawings. The present invention is not limited to the exemplary embodiments.

First Exemplary Embodiment

First, a first exemplary embodiment according to the present invention will be described.

Figure 1:
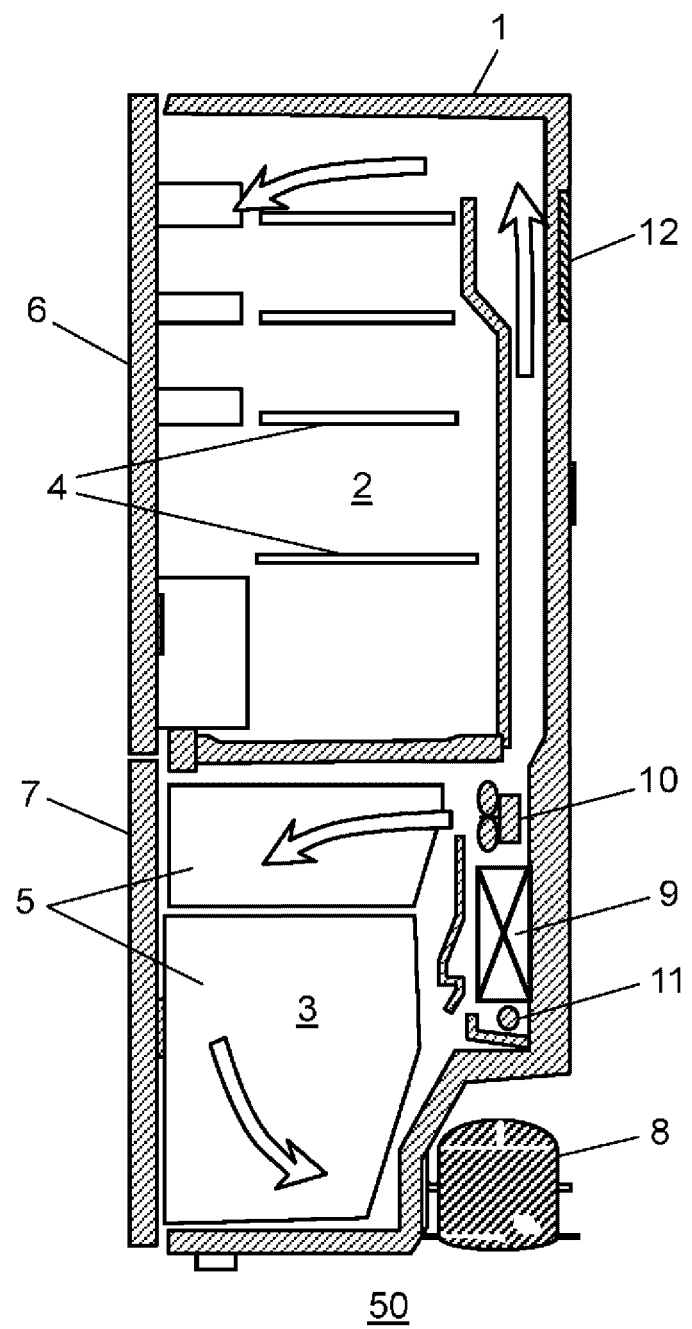
FIG. 1 is a view illustrating a sectional configuration of a simple inverter-controlled refrigerator according to a first exemplary embodiment of the present invention.
Figure 2:
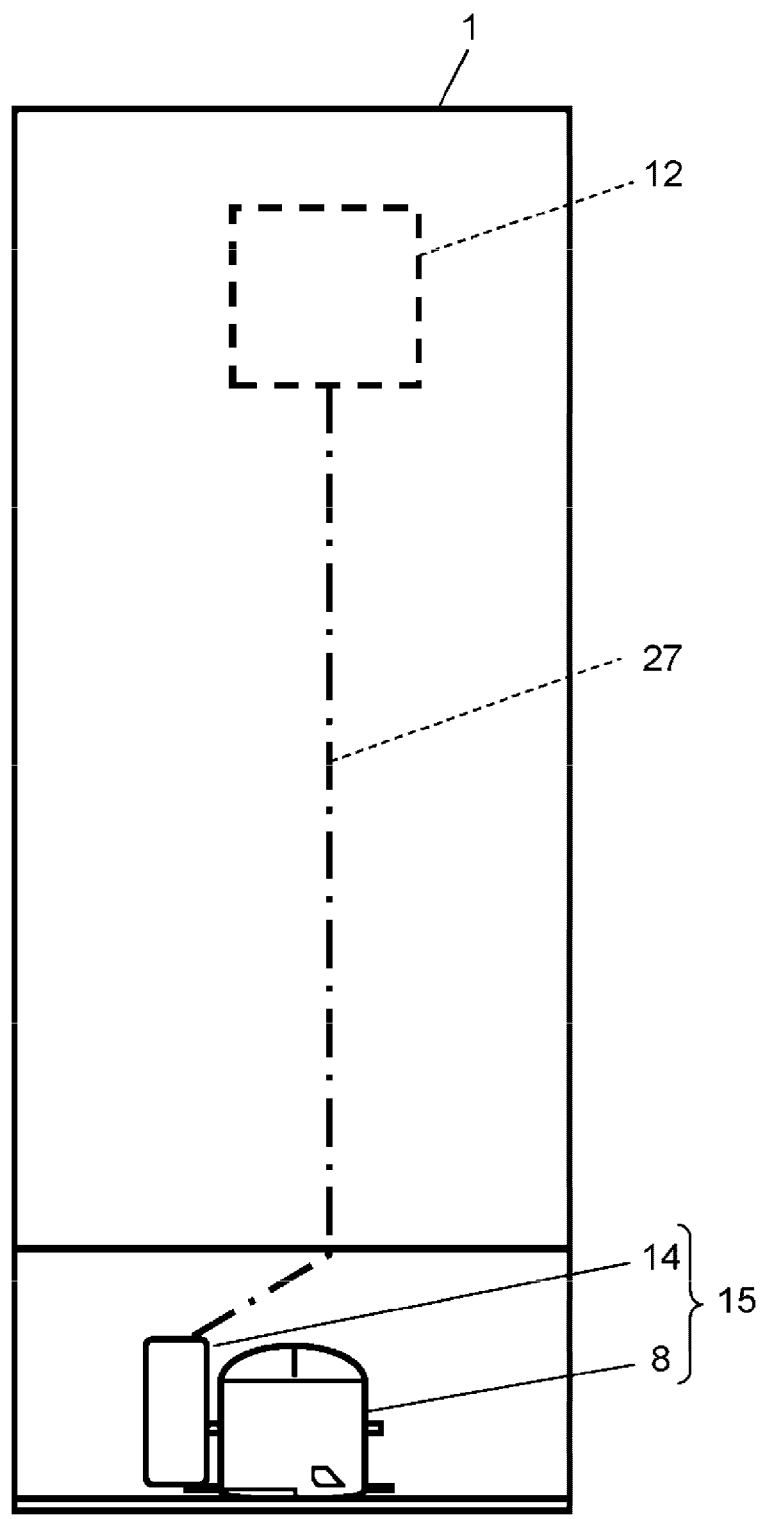
FIG. 2 is a view illustrating a configuration when viewed from a rear surface of the simple inverter-controlled refrigerator according to the first exemplary embodiment of the present invention.
Figure 3:
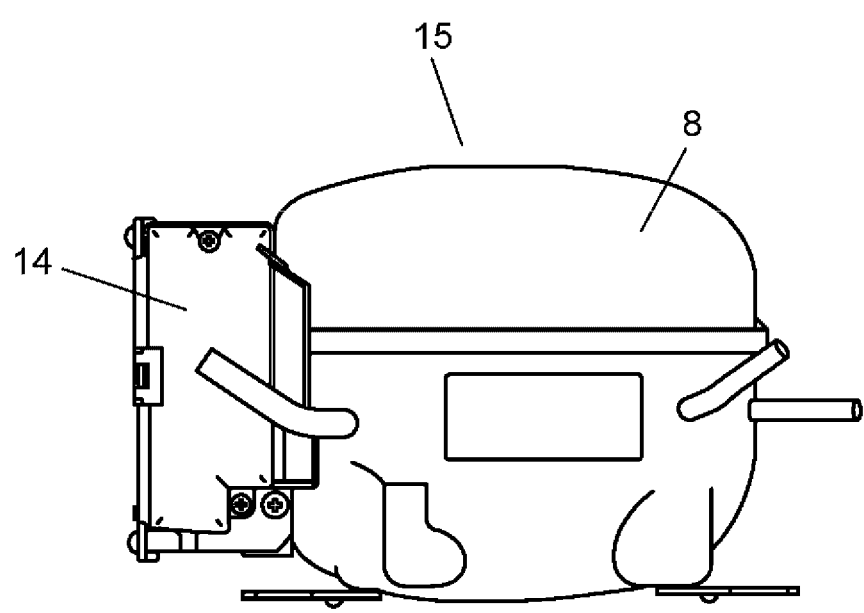
FIG. 3 is a side view of an inverter compressor incorporated in the simple inverter-controlled refrigerator according to the first exemplary embodiment of the present invention.

FIG. 1 is a view illustrating a sectional configuration of simple inverter-controlled refrigerator 50 according to the first exemplary embodiment of the present invention. FIG. 2 is a view illustrating a configuration when viewed from a rear surface of simple inverter-controlled refrigerator 50. FIG. 3 is a side view of an inverter compressor incorporated in simple inverter-controlled refrigerator 50.

As illustrated in FIGS. 1 to 3, simple inverter-controlled refrigerator 50 includes refrigerator main body 1 configured to be filled with a foam insulation material. Refrigerator main body 1 is internally partitioned into two compartments such as upper refrigerator compartment 2 and lower freezer compartment 3. Multiple shelf boards 4 are disposed in upper refrigerator compartment 2, and two upper and lower freezer compartment cases 5 are disposed in lower freezer compartment 3 so as to be freely drawn therefrom.

Each front surface opening of refrigerator compartment 2 and freezer compartment 3 of refrigerator main body 1 is configured to be freely opened and closed by respective doors 6 and 7.

A freezing system configured so that variable speed compressor 8, cooler 9, a pressure reducer, and an evaporator (both are not illustrated) are connected to each other in a loop shape is disposed in a rear surface section of refrigerator main body 1. Cool air generated in cooler 9 is configured to be circulated in refrigerator compartment 2 and freezer compartment 3 by cooling fan 10 so as to cool each compartment. Frost adhering to cooler 9 is configured to be removed by defrosting heater 11 at every predetermined time.

The above-described freezing system and constant speed main body control unit 12 are incorporated in the rear surface section of refrigerator main body 1. Constant speed main body control unit 12 is configured to function as one independent unit as illustrated in FIG. 2. In a case of constant speed refrigerator, constant speed main body control unit 12 alone is configured to control a compressor incorporated in a case of the constant speed refrigerator.

On the other hand, in a case where constant speed main body control unit 12 is used for simple inverter-controlled refrigerator 50, inverter control unit 14 is connected to constant speed main body control unit 12 via cable 27, and a speed of variable speed compressor 8 is configured to be variably controlled. As is apparent from FIG. 2, inverter control unit 14 is also configured to function as one unit independent of constant speed main body control unit 12.

According to the present exemplary embodiment, inverter control unit 14 is integrated with variable speed compressor 8 in advance as illustrated in FIG. 3, thereby configuring inverter compressor 15. According to the present exemplary embodiment, instead of the compressor incorporated in the constant speed refrigerator, inverter compressor 15 is installed.

Here, the integration means that variable speed compressor 8 and inverter control unit 14 are disposed together as one unit.

According to the present exemplary embodiment, inverter control unit 14 is attached to a bracket (not illustrated) welded to an outer shell of variable speed compressor 8 via an attachment leg (not illustrated) disposed in inverter control unit 14.

Hereinafter, the control of variable speed compressor 8 which is performed by constant speed main body control unit 12 and inverter control unit 14, that is, the control of simple inverter-controlled refrigerator 50 will be described with reference to FIGS. 4 and 5.

Figure 4:
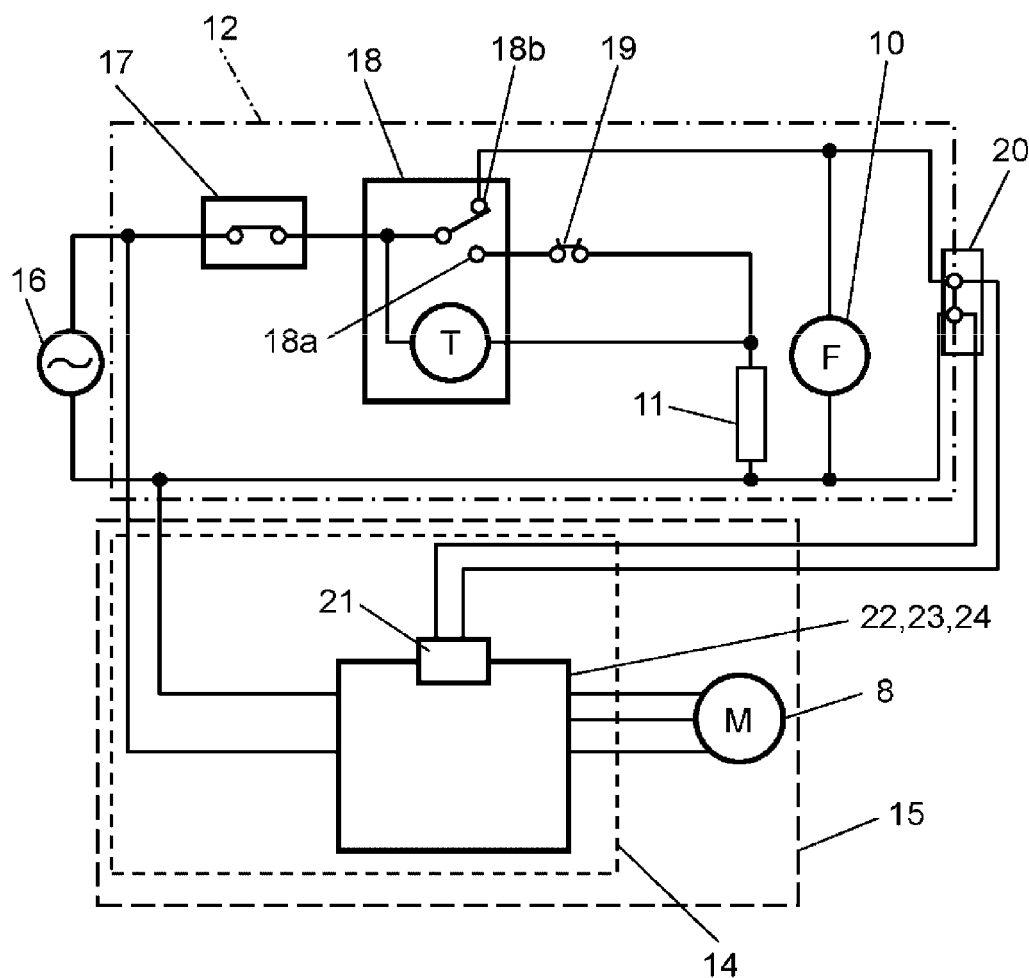
FIG. 4 is a control block diagram of the simple inverter-controlled refrigerator configured to have inverter compressor incorporated therein according to the first exemplary embodiment of the present invention.

FIG. 4 is a control block diagram of simple inverter-controlled refrigerator 50 configured to have inverter compressor 15 incorporated therein according to the first exemplary embodiment of the present invention. FIG. 5 is a main unit block diagram illustrating a circuit configuration around an inverter control unit of simple inverter-controlled refrigerator 50.

FIG. 4 illustrates commercial power source 16. For example, in a case of Japan, commercial power source 16 is a power source having a fixed voltage and a fixed frequency such as 100 V 60 Hz, and supplies power to constant speed main body control unit 12 incorporated in refrigerator main body 1.

Constant speed main body control unit 12 is configured to include temperature detector 17 such as a thermostat or a thermistor which can turn on/off the power source, defrosting heater 11 connected to temperature detector 17 via normally open contact 18a of defrosting timer 18 and bimetal switch 19 for detecting completed defrosting, and cooling fan 10 and on/off output unit 20 which are connected to temperature detector 17 via normally closed contact 18b of defrosting timer 18. Constant speed main body control unit 12 is configured so that the constant speed compressor can be driven by temperature detector 17 turning on/off the power source.

Inverter control unit 14 of inverter compressor 15 incorporated in refrigerator main body 1 is connected to on/off output unit 20 of constant speed main body control unit 12.

As described above, inverter control unit 14 is incorporated in refrigerator main body 1 in a state of being integrated with variable speed compressor 8, that is in a form of inverter compressor 15, and variably controls of the speed of variable speed compressor 8, based on a power on/off signal from on/off output unit 20 of constant speed main body control unit 12. Therefore, as illustrated in FIG. 5, inverter control unit 14 is configured so that power on/off detection circuit 21, rotation speed setting unit 23 having operation rate calculation unit 22, and inverter drive circuit unit 24 are collectively unitized.

Inverter control unit 14 is operated by obtaining power from commercial power source 16 which supplies the power to constant speed main body control unit 12.

Rotation speed setting unit 23 sets a rotation speed, based on an on/off output signal from on/off output unit 20 of constant speed main body control unit 12. Rotation speed setting unit 23 is configured to have a microcomputer. Photo-coupler 26 converts an on/off output signal supplied from on/off output unit 20 via connector 25 of power on/off detection circuit 21 into a signal. Rotation speed setting unit 23 is configured to set the rotation speed by calculating an operation rate, based on a power on/off time thereof.

Inverter drive circuit unit 24 includes a rectifier circuit which rectifies commercial power source 16 of constant speed main body control unit 12, an inverter circuit configured so that 6 power elements are connected by means of three phase bridge connection, and a position detection circuit (all are not illustrated) which detects a rotation position of a motor rotor of variable speed compressor 8. Inverter drive circuit unit 24 is configured so as to rotate a compressor drive motor by controlling the power elements of the inverter circuit to be turned on/off in accordance with a rotation speed command from rotation speed setting unit 23 and a rotation position detected state of the compressor drive motor rotor which is output from the position detection circuit.

Figure 5:
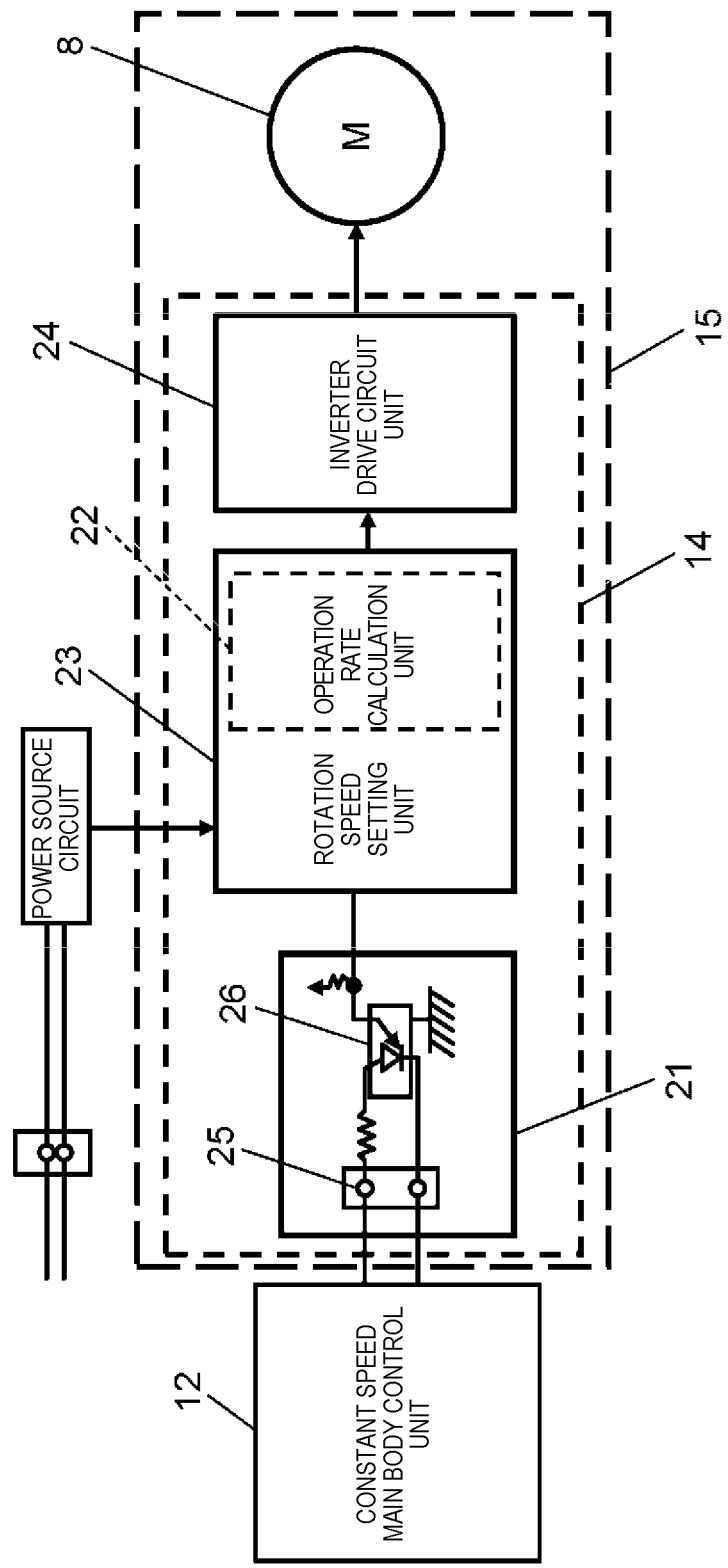
FIG. 5 is a main unit block diagram illustrating a circuit configuration around an inverter control unit of the simple inverter-controlled refrigerator according to the first exemplary embodiment of the present invention.

According to the present exemplary embodiment, as is understood from FIGS. 4 and 5, constant speed main body control unit 12 is configured to output the power on/off signal, in a form of "power-on" when a commercial power source voltage current for driving the constant speed compressor is output from on/off output unit 20, and in a form of "power-off" when the current is stopped. Power on/off detection circuit 21 of inverter control unit 14 is connected to on/off output unit 20 of constant speed main body control unit 12, and is configured to be capable of detecting even a high output such as the commercial power source voltage current for driving the constant speed compressor by incorporating the high output as a power on/off signal.

That is, inverter control unit 14 is configured to be operated by directly detecting the high output from on/off output unit 20 of constant speed main body control unit 12 as the power on/off signal. According to the above-described configuration, on/off output unit 20 of constant speed main body control unit 12 is shared as a connector for connecting the constant speed compressor or a connector for being connected to inverter control unit 14, thereby achieving a simplified configuration.

An operation of simple inverter-controlled refrigerator 50 configured as described above will be described with reference to FIGS. 6 to 8.

Figure 6:
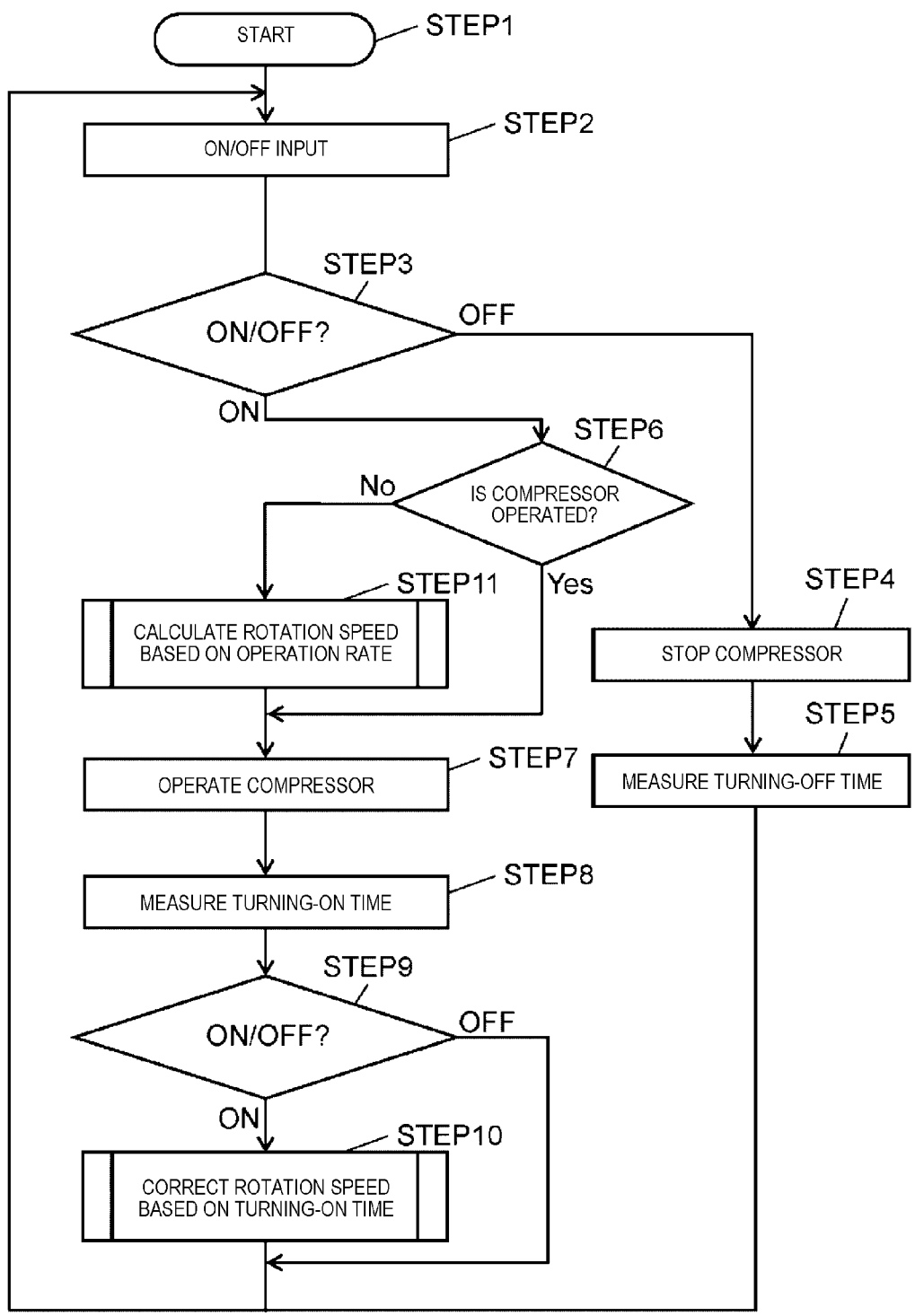
FIG. 6 is a flowchart illustrating a control flow of the simple inverter-controlled refrigerator according to the first exemplary embodiment of the present invention.
Figure 7:
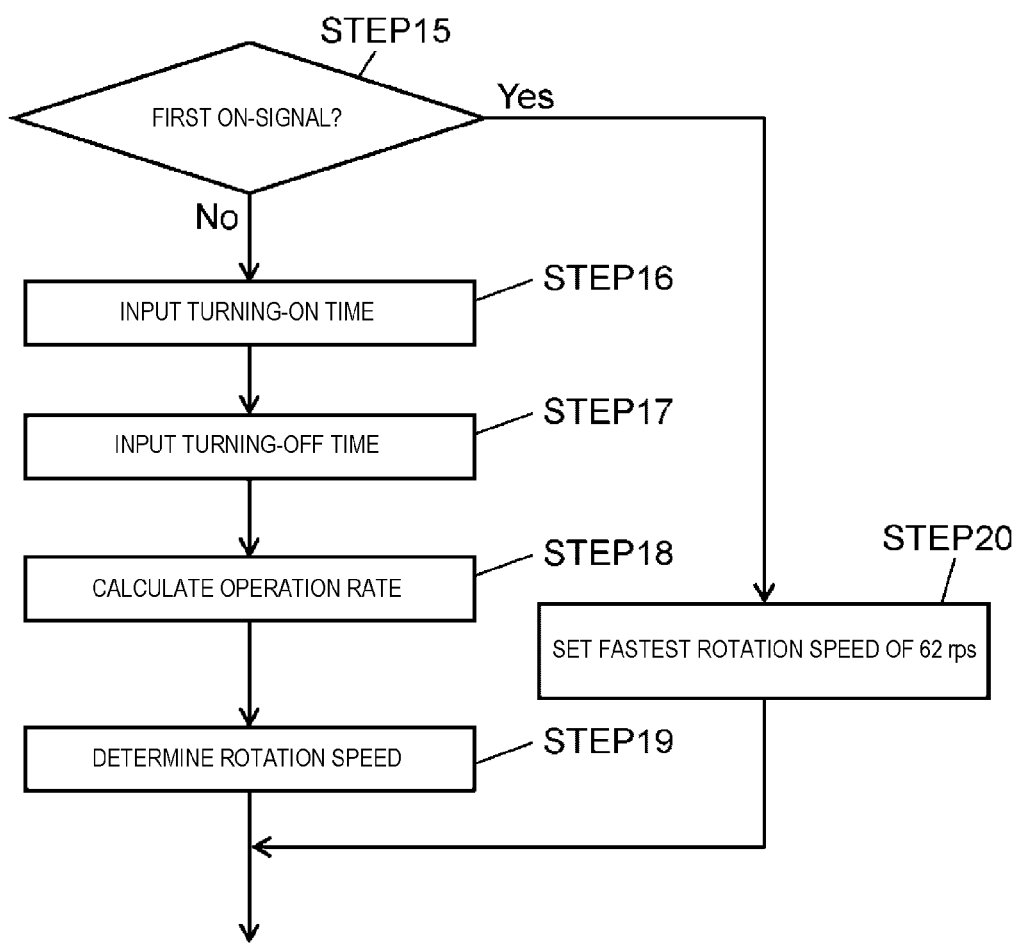
FIG. 7 is a flowchart illustrating an operation rate and an operation for determining a rotation speed in the simple inverter-controlled refrigerator according to the first exemplary embodiment of the present invention.
Figure 8:
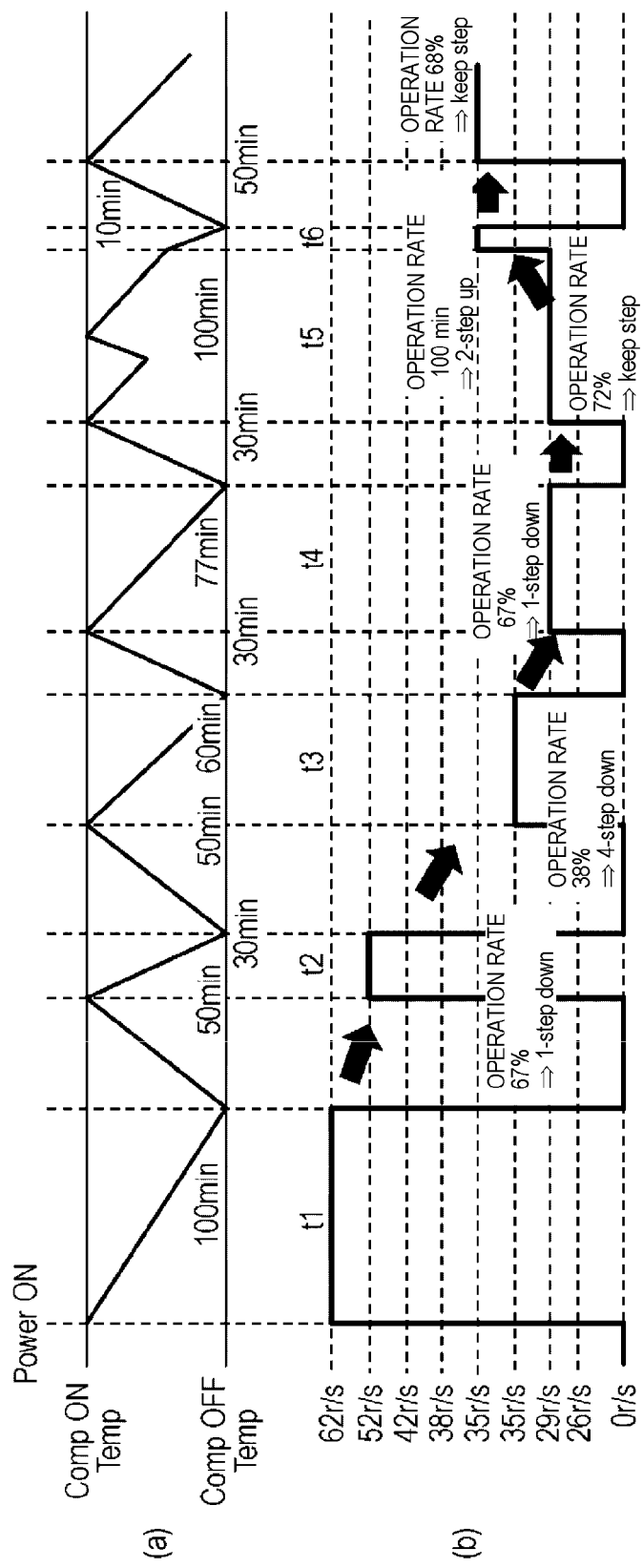
FIG. 8 is a view for describing an example of operation timing in controlling the rotation speed of the simple inverter-controlled refrigerator according to the first exemplary embodiment of the present invention.

FIG. 6 is a flowchart illustrating a control flow of simple inverter-controlled refrigerator 50 according to the first exemplary embodiment of the present invention. FIG. 7 is a flowchart illustrating an operation rate and an operation for determining a rotation speed in simple inverter-controlled refrigerator 50, and is a flow chart which illustrates STEP 11 of FIG. 6 in more detail. FIG. 8 is a view for describing an example of operation timing in controlling the rotation speed of simple inverter-controlled refrigerator 50.

In FIG. 6, STEP 1 represents the operation start. Power is supplied to constant speed main body control unit 12 from commercial power source 16, thereby starting the operation.

In this case, if a temperature of refrigerator compartment 2 is higher than a predetermined temperature, constant speed main body control unit 12 is in an on-state in a state where temperature detector 17 is closed. In contrast, if the temperature of refrigerator compartment 2 is lower than the predetermined temperature, constant speed main body control unit 12 is in an off-state in a state where temperature detector 17 is opened.

In STEP 2, inverter control unit 14 inputs either an on-output signal or an off-output signal from on/off output unit 20 of constant speed main body control unit 12. In STEP 3, inverter control unit 14 determines whether the output signal is input.

In a case where it is determined in STEP 3 that the off-signal is input, variable speed compressor 8 is brought into a stopped state in STEP 4. In STEP 5, the stopped time is measured, and the process returns to STEP 2.

On the other hand, in a case where it is determined in STEP 3 that the on-signal is input, inverter control unit 14 determines in STEP 6 whether or not variable speed compressor 8 has already been operated. If variable speed compressor 8 is operated, inverter control unit 14 operates variable speed compressor 8 without any change in STEP 7, and measures the operating time in STEP 8.

In STEP 9, inverter control unit 14 determines whether the signal input from on/off output unit 20 of constant speed main body control unit 12 is either the on-signal or the off-signal. If it is determined as the off-signal, the process returns to STEP 2. The operation from STEP 2 is repeatedly performed, and variable speed compressor 8 is brought into a stopped state in STEP 4. That is, the temperature of refrigerator compartment 2 reaches the predetermined temperature, and temperature detector 17 is turned off, thereby stopping a cooling operation.

On the other hand, if the determination in STEP 9 is unchanged and the turning-on time measured in STEP 8 is equal to or longer than the predetermined time, in accordance with the elapsed time, rotation speed setting unit 23 corrects the rotation speed of variable speed compressor 8 in STEP 10, and the process returns to STEP 2.

This correction of the rotation speed of variable speed compressor 8 is determined in advance by the turning-on time of variable speed compressor 8, and is set as illustrated in (Table 1), for example.

TABLE 1

| TURNING-ON TIME [min] | ROTATION UP |
| --- | --- |
| When 100 minutes elapse | 2 Stage Acceleration |
| When 120 minutes elapse | 3 Stage Acceleration |

That is, as illustrated in Table 1, in a case where 100 minutes elapse during the turning-on time of variable speed compressor 8, the rotation speed of variable speed compressor 8 is accelerated two stages. In a case where 120 minutes elapse, the rotation speed is accelerated three stages so as to increase the cooling capacity. The process returns to STEP 2, and inverter control unit 14 repeatedly performs the operation from STEP 2 so as to continue the cooling operation.

If the turning-on time of variable speed compressor 8 is equal to or longer than the predetermined time, the rotation speed is accelerated, and the cooling capacity is increased, thereby enabling quick cooling. For example, it is possible to quickly perform cooling in a case where external air entering due to door opening and closing increases a load, or in a case where a huge foodstuff storage amount increases a load.

In particular, according to the present exemplary embodiment, the rotation speed is accelerated two stages or three stages instead of a single stage. Accordingly, this configuration is effectively adopted in that the cooling can be more quickly performed.

On the other hand, if it is determined in STEP 6 that variable speed compressor 8 is not operated, operation rate calculation unit 22 calculates the rotation speed based on the operation rate of variable speed compressor 8 in STEP 11.

The rotation speed based on this operation rate is calculated as illustrated by the flowchart in FIG. 7. That is, in a case where it is determined in STEP 15 whether or not the on-signal input in STEP 3 is the first on-signal input and it is determined that the on-signal input is not the first on-signal input, the turning-on time when the previous operation is performed is incorporated in STEP 16. Next, in STEP 17, the turning-on time when the previous operation is performed is incorporated. In STEP 18, operation rate calculation unit 22 calculates the operation rate. This operation rate can be obtained by (Expression 1) in the following.

Operation Rate=(Turning-On Time/Turning-On Time+Turning-Off Time)×100[%]     [Expression 1]

Based on the calculation rate calculated in STEP 18, rotation speed setting unit 23 determines the rotation speed of variable speed compressor 8 in STEP 19, and operates variable speed compressor 8. This rotation speed is determined in advance in accordance with the operation rate, and is set as illustrated in (Table 2), for example.

TABLE 2

| Previous Cycle Operation Rate | Rotation Speed Increase or Decrease Compared to Previous Cycle Rotation Speed |
| --- | --- |
| Operation Rate 0% to 50% | 4 stage deceleration |
| Operation Rate 50% to 56% | 3 stage deceleration |
| Operation Rate 56% to 62% | 2 stage deceleration |

TABLE 2-continued

| Previous Cycle Operation Rate | Rotation Speed Increase or Decrease Compared to Previous Cycle Rotation Speed |
|---|---|
| Operation Rate 62% to 68% | 1 stage deceleration |
| Operation Rate 68% to 74% | maintaining current rotation speed |
| Operation Rate 74% to 80% | 1 stage acceleration |
| Operation Rate 80% to 86% | 2 stage acceleration |
| Operation Rate 86% to 100% | 3 stage acceleration |

That is, the operation rate is divided into several stages, and the operation rate allowing the most efficient operation is set to be a target operation rate. As the operation rate increases and decreases, acceleration and deceleration are set one stage by one stage, vertically from the center of the target operation rate. For example, in the example in FIG. 2, an operation range of 0% to 100% is divided into 8 stages. For example, if the operation rate enabling the refrigerator to be most efficiently operated is in the range of 68% to 74% as illustrated in Table 2, the range is set to be the target operation rate. Then, as the operation rate increases and decreases, the rotation speed is set by sequentially accelerating and decelerating one stage by one stage, vertically from the center of the target operation rate.

Therefore, the rotation speed of variable speed compressor 8 is accelerated and decelerated so that the operation rate gradually becomes the target operation rate which is most efficient for the refrigerator, if there is no change in a load while the cooling operation is repeatedly turned on and off. In this manner, the refrigerator is operated, thereby enabling improved energy saving operation.

In particular, according to the present exemplary embodiment, especially when the refrigerator is operated at the operation whose deviation rate is great from the target operation rate enabling the refrigerator to be most efficiently operated, a degree of accelerating and decelerating the rotation speed, that is, a change width of the rotation speed is set to be greater.

Accordingly, especially when the operation rate is great from the target operation rate, that is, the operation rate enabling the refrigerator to be most efficiently operated, the rotation speed of variable speed compressor 8 is greatly changed. In this manner, the refrigerator can be quickly operated with the target operation rate. Correspondingly, it is possible to further achieve energy saving.

In the present exemplary embodiment, an example has been described in which the target operation rate is in the range of 68% to 74%. However, depending on the capacity and form of the refrigerator, the targets rates are slightly different from each other. Therefore, the most efficient operation rate may be appropriately set by being obtained by performing an experiment in advance. The most efficient operation rate is normally set to the range of 50% to 90%, and preferably 60% to 80%. In this manner, it is possible to realize an improved energy saving refrigerator.

On the other hand, in a case where it is determined in STEP 15 that the on-signal input is the first on-signal input in STEP 3, in STEP 20, rotation speed setting unit 23 sets the rotation speed to a rotation speed equal to or faster than a predetermined rotation speed, for example, the fastest rotation speed. The process proceeds to STEP 7, and rotation speed setting unit 23 drives variable speed compressor 8 at the set speed. That is, in a case where the on-signal output from on/off output unit 20 of constant speed main body control unit 12 is the first on-signal input, in other words, the first operation after the power is turned on, foodstuff is not cooled yet, and it is estimated that the refrigerator is in a greatly loaded state. Accordingly, variable speed compressor 8 is driven at the predetermined rotation speed or faster, that is, the fastest rotation speed in this example. Therefore, it is possible to quickly cool the foodstuff down to the predetermined temperature.

This control is also effective, when the on-signal in STEP 3 is the signal-on input after a defrosting operation is performed, if the on-signal input can be determined. The reason is that it is possible to quickly cool the refrigerator down to the predetermined temperature by necessarily driving variable speed compressor 8 at the fastest rotation speed, when the defrosting raises the temperature and increases the load. Driving variable speed compressor 8 at the fastest rotation speed used during the defrosting may be stopped, based on a defrosting completion detection signal output from defrosting completion detection thermistor.

Next, the above-described rotation speed control will be described in more detail with reference to FIG. 8.

FIG. 8 is a view for describing an example of operation timing in controlling the rotation speed of simple inverter-controlled refrigerator 50 according to the first exemplary embodiment of the present invention.

In FIG. 8, a section (a) indicates a cooling operation, that is, a temperature state of refrigerator compartment 2 when inverter control unit 14 operates variable speed compressor 8, and a section (b) indicates an operation status of variable speed compressor 8. The horizontal axis indicates a time.

First, when the on-signal is input from on/off output unit 20 of constant speed main body control unit 12 and inverter control unit 14 starts to drive variable speed compressor 8, if the on-signal input is the first on-signal input, variable speed compressor 8 starts to cool the refrigerator at the fastest speed as illustrated by t1, for example, at the speed of 62 rps.

In this manner, refrigerator compartment 2 is cooled. If the temperature is gradually lowered and reaches the predetermined temperature, that is, a compressor turning-off temperature, variable speed compressor 8 is stopped.

Then, if the temperature of refrigerator compartment 2 is gradually raised and reaches a compressor turning-on temperature, variable speed compressor 8 is driven, and the cooling is progressively performed as illustrated by t2.

In this case, if turning-on time t1 when variable speed compressor 8 is previously operated shows 100 minutes and the turning-off time shows 50 minutes, the operation rate calculated from the turning-on/off time, based on Expression 1 is 67%. Since the predetermined operation rate range in Table 2 corresponds to the operation rate of 62% to 68% in this example, rotation speed setting unit 23 decelerates the rotation speed used during the previous operation as slow as one stage, and sets the rotation speed.

As described above, the accelerating and decelerating stages of variable speed compressor 8 are set in 8 stages from 1 to 8. For example, the respective rotation speeds are set as illustrated in (Table 3) below.

TABLE 3

| Speed Step | Rotation Speed [r/s] |
|---|---|
| 1 | 26 |
| 2 | 29 |
| 3 | 32 |
| 4 | 35 |
| 5 | 38 |
| 6 | 42 |

TABLE 3-continued

| Speed Step | Rotation Speed [r/s] |
|---|---|
| 7 | 52 |
| 8 | 62 |

Therefore, in this case, based on Table 3, rotation speed setting unit 23 of inverter control unit 14 decelerates Stage 8 of 62 rps indicating the fastest rotation which is the rotation speed used during the previous operation, to Stage 7, and sets the rotation speed to 52 rps. Variable speed compressor 8 is rotated at the speed of 52 rps.

Next, variable speed compressor 8 is rotated at the speed of 52 rps, and the cooling is progressively performed as illustrated by t2. If refrigerator compartment 2 is cooled down to the predetermined temperature, variable speed compressor 8 is stopped. Then, if the temperature of refrigerator compartment 2 starts to rise and rises up to the compressor turning-on temperature, variable speed compressor 8 is driven again so as to start the cooling.

In this case, if the turning-on time of variable speed compressor 8 shows 30 minutes and the turning-off time shows 50 minutes, the operation rate calculated from the turning-on/off time is 38%. Rotation speed setting unit 23 decelerates the rotation speed as slow as the rotation speed corresponding to the predetermined operation rate range which allows 38% in Table 2. In this example, rotation speed setting unit 23 further decelerates the rotation speed as slow as 4 stages from the rotation speed used during the previous operation. Then, based on Table 3, rotation speed setting unit 23 sets the rotation speed to 32 rps which is obtained by decelerating the rotation speed from Stage 7 during the previous operation to Stage 3 as slow as 4 stages. Variable speed compressor 8 is rotated at the speed of 32 rps so as to perform the cooling.

Furthermore, variable speed compressor 8 is rotated at the speed of 32 rps, and the cooling is progressively performed as illustrated by t3. If refrigerator compartment 2 is cooled down to the predetermined temperature, variable speed compressor 8 is stopped. Then, if the temperature of refrigerator compartment 2 starts to rise and rises up to the compressor turning-on temperature, variable speed compressor 8 is driven again so as to start the cooling.

In this case, if the turning-on time of variable speed compressor 8 shows 60 minutes and the turning-off time shows 30 minutes, the operation rate calculated from the turning-on/off time is 67%. Rotation speed setting unit 23 decelerates the rotation speed as slow as the rotation speed corresponding to the predetermined operation rate range which allows 67% in Table 2. In this example, rotation speed setting unit 23 further decelerates the rotation speed as slow as 1 stage from the rotation speed used during the previous operation. Then, based on Table 3, rotation speed setting unit 23 sets the rotation speed to 29 rps which is obtained by decelerating the rotation speed from Stage 3 during the previous operation to Stage 2 as slow as 1 stage. Variable speed compressor 8 is rotated at the speed of 29 rps so as to perform the cooling.

Furthermore, variable speed compressor 8 is rotated at the speed of 29 rps, and the cooling is progressively performed as illustrated by t4. If refrigerator compartment 2 is cooled down to the predetermined temperature, variable speed compressor 8 is stopped. Then, if the temperature of refrigerator compartment 2 starts to rise and rises up to the compressor turning-on temperature, variable speed compressor 8 is driven again so as to start the cooling.

In this case, if the turning-on time of variable speed compressor 8 shows 77 minutes and the turning-off time shows 30 minutes, the operation rate calculated from the turning-on/off time is 72%. Rotation speed setting unit 23 maintains the rotation speed corresponding to the predetermined operation rate range which allows 72% in Table 2. In this example, rotation speed setting unit 23 maintains the rotation speed of 29 rps. Variable speed compressor 8 is rotated at the speed of 29 rps so as to perform the cooling.

Furthermore, variable speed compressor 8 is rotated at the speed of 29 rps, and the cooling is progressively performed as illustrated by t5. If 100 minutes elapse as it is, rotation speed setting unit 23 regards the cooling capacity as insufficient. As illustrated in Table 1, rotation speed setting unit 23 accelerates the rotation speed two stages, sets the rotation speed to 35 rps, and operates variable speed compressor 8 so as to continue the cooling operation.

If refrigerator compartment 2 is cooled down to the predetermined temperature, variable speed compressor 8 is stopped. Then, if the temperature of refrigerator compartment 2 starts to rise and rises up to the compressor turning-on temperature, variable speed compressor 8 is driven again so as to start the cooling.

In this case, if the turning-on time of variable speed compressor 8 shows a total of 110 minutes such as 100 minutes at the rotation speed of 29 rps and 10 minutes at the rotation speed of 35 rps and the turning-off time shows 50 minutes, the operation rate calculated from the turning-on/off time is 68%. Rotation speed setting unit 23 maintains the rotation speed corresponding to the predetermined operation rate range which allows 68% in Table 2. In this example, rotation speed setting unit 23 maintains the rotation speed used during the previous operation. Then, rotation speed setting unit 23 maintains the rotation speed of 35 rps, and variable speed compressor 8 is rotated at the speed of 35 rps so as to perform the cooling.

Thereafter, similar operations are repeatedly performed, and variable speed compressor 8 is rotated at the rotation speed set by rotation speed setting unit 23 of inverter control unit 14 so as to perform the cooling.

As described above, simple inverter-controlled refrigerator 50 according to the present exemplary embodiment is operated.

According to simple inverter-controlled refrigerator 50 operated in this way, inverter control unit 14 and variable speed compressor 8 which are formed as a unit separate from constant speed main body control unit 12 are incorporated in constant speed refrigerator having constant speed main body control unit 12 which controls a constant speed by causing temperature detector 17 to turn on or off the compressor. In this simple manner, constant speed refrigerator can function as the simple inverter-controlled refrigerator.

Moreover, in this case, the refrigerator main body side does not need to replace constant speed main body control unit 12 with inverter control unit 14. Inverter control unit 14 is directly and supplementarily connected via cable 27 to constant speed main body control unit 12 mounted on the refrigerator main body as it is. In this simple manner, it is possible to provide the inverter-controlled refrigerator for a refrigerator manufacturer side without requiring much trouble.

That is, the refrigerator manufacturer side incorporates inverter control unit 14 configured so that rotation speed setting unit 23 and inverter drive circuit unit 24 function as one unit, and variable speed compressor 8, or inverter compressor 15 in which these are integrally assembled to each other, in the refrigerator as components. In this simple manner, it is possible to realize the simple inverter-controlled refrigerator. In this way, simple inverter-controlled refrigerator 50 can be easily, frequently, and quickly provided in response to a demand situation.

According to the present exemplary embodiment, cooling fan 10 is configured to be separately controlled by constant speed main body control unit 12 without interposing inverter control unit 14 therebetween. Accordingly, it is not necessary to carry out wiring connection work so that inverter control unit 14 performs the turning-on/off control. Therefore, the constant speed refrigerator can more easily function as the simple inverter-controlled refrigerator. Accordingly, it is possible to more easily, frequently, and quickly provide simple inverter-controlled refrigerator 50.

Moreover, inverter control unit 14 includes power on/off detection circuit 21 which is operated by directly detecting the high output from on/off output unit 20 of constant speed main body control unit 12 as the power on/off signal. Accordingly, it is not necessary to interpose a low-voltage conversion circuit between power on/off detection circuit 21 and on/off output unit 20 of constant speed main body control unit 12. Therefore, it is possible to more easily, frequently, and quickly provide simple inverter-controlled refrigerator 50.

In addition, inverter control unit 14 is configured to set the rotation speed so that the operation rate determined by operation rate calculation unit 22 calculating the operation rate falls within the predetermined range. In this manner, in a case where the operation rate is lower than the predetermined operation rate, the rotation speed is controlled to be lowered. On the other hand, in a case where the operation rate is higher than the predetermined operation rate, the rotation speed is controlled to be raised. As a result, the rotation speed of variable speed compressor 8 is controlled within the operation rate range allowing the refrigerator to show the most improved system efficiency. Therefore, it is possible to realize the improved energy saving refrigerator.

Furthermore, rotation speed setting unit 23 is configured to drive variable speed compressor 8 by accelerating the rotation speed, if the power-on time exceeds the predetermined time. Accordingly, if the cooling time during the power-on time is lengthened after exceeding the predetermined time, the cooling capacity can be increased by raising the rotation speed, and thus, it is possible to quickly perform the cooling.

On the other hand, inverter control unit 14 includes power on/off detection circuit 21, rotation speed setting unit 23 configured to set the rotation speed based on the power on/off signal output from power on/off detection circuit 21, and inverter drive circuit unit 24 which drives variable speed compressor 8 at the rotation speed set by rotation speed setting unit 23. All of these are configured to function as one unit.

In this manner, if inverter control unit 14 detects the power on/off signal, inverter control unit 14 itself can set the rotation speed. Therefore, the inverter can perform variable speed control without adding a rotation speed setting function to a device body control unit side such as constant speed main body control unit 12 in which inverter control unit 14 is incorporated. Accordingly, it is possible to simply realize the simple inverter-controlled refrigerator by incorporating inverter control unit 14 in the constant speed refrigerator as a component.

Moreover, inverter control unit 14 is configured to set the rotation speed so that the operation rate determined by operation rate calculation unit 22 falls within the predetermined range. Accordingly, in a case where inverter control unit 14 is incorporated in the refrigerator, variable speed compressor 8 can be rotated within the operation rate range allowing the refrigerator to show the most improved system efficiency. Therefore, it is possible to realize the improved energy saving refrigerator.

Furthermore, inverter control unit 14 is configured to be capable of driving variable speed compressor 8 by accelerating the rotation speed, if the power-on time exceeds the predetermined time. Accordingly, in a case where inverter control unit 14 is incorporated in the refrigerator, if the cooling time during the power-on time is lengthened after exceeding the predetermined time, the cooling capacity can be increased by raising the rotation speed, and thus, it is possible to provide the refrigerator which can perform the quick cooling.

Furthermore, inverter control unit 14 is configured to be capable of driving variable speed compressor 8 by setting the rotation speed which is equal to or faster than the predetermined rotation speed during a fixed time from the power-on time. In this manner, in a case where inverter control unit 14 is incorporated in the refrigerator, when the refrigerator starts to be used or when the operation restarts after the defrosting operation, the refrigerator can be cooled at the rotation speed which is equal to or faster than the predetermined rotation speed, for example, at the fastest rotation speed.

Inverter compressor 15 in which inverter control unit 14 and variable speed compressor 8 are integrated with each other has inverter control unit 14 as an integrated body. Accordingly, it is possible to realize the simple inverter-controlled refrigerator by incorporating inverter control unit 14 instead of the constant speed compressor of the constant speed refrigerator. Therefore, while the constant speed refrigerator is manufactured, the simple inverter-controlled refrigerator can be intermediately manufactured. Moreover, in this case, since inverter control unit 14 and variable speed compressor 8 are integrated with each other, it is possible to easily carry out the incorporating work. Therefore, it is possible to frequently and quickly provide the simple inverter-controlled refrigerator.

Second Exemplary Embodiment

Next, simple inverter-controlled refrigerator 50 according to a second exemplary embodiment of the present invention will be described.

Figure 9:
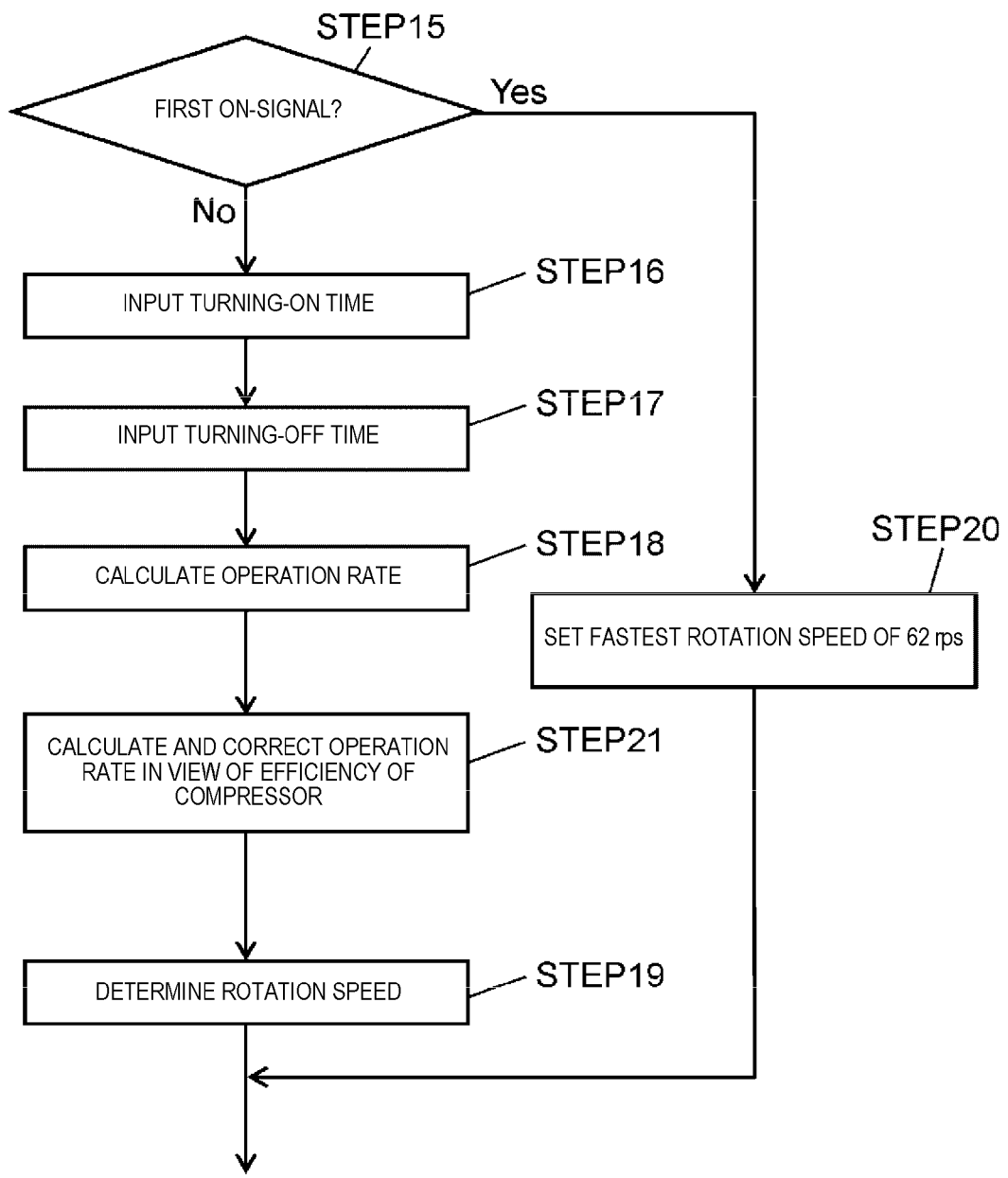
FIG. 9 is a flowchart illustrating an operation rate and an operation for determining a rotation speed in a simple inverter-controlled refrigerator according to a second exemplary embodiment of the present invention.
Figure 10:
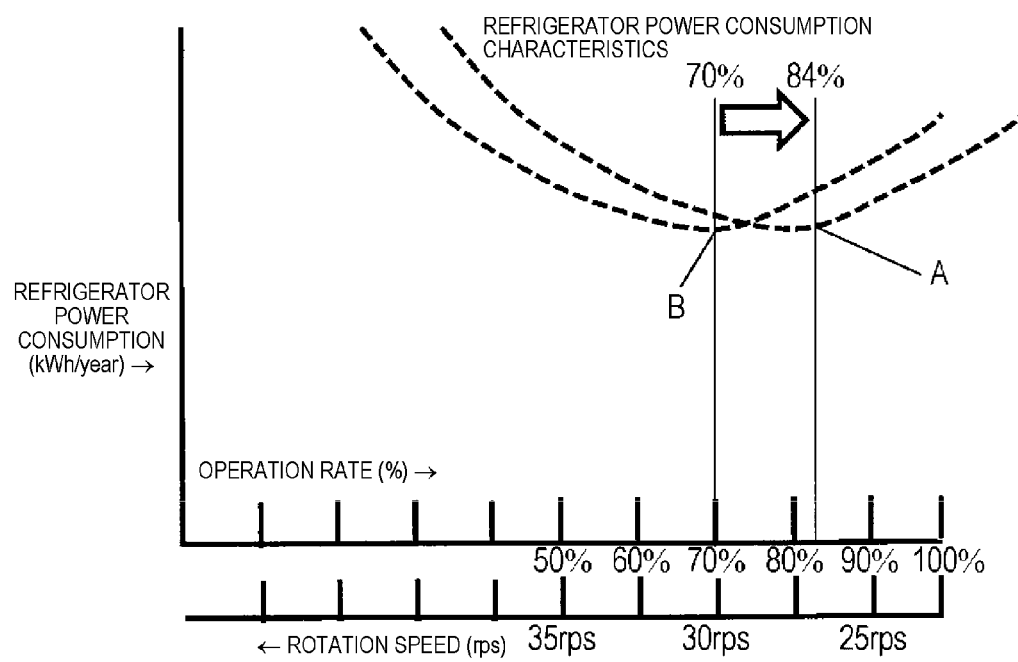
FIG. 10 is a characteristic graph illustrating a relationship among an operation rate, a compressor rotation speed, and refrigerator power consumption in the simple inverter-controlled refrigerator according to the second exemplary embodiment of the present invention.
Figure 11:
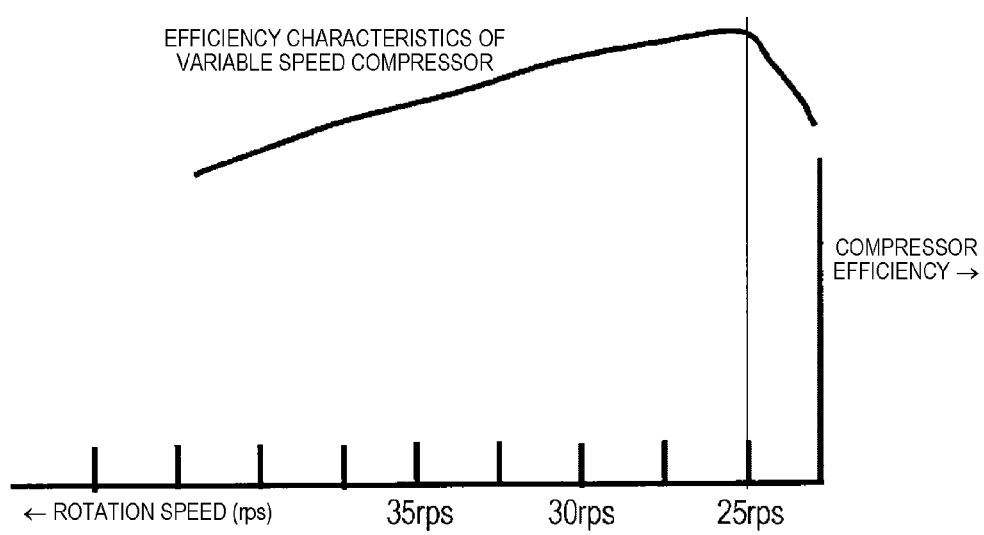
FIG. 11 is a is a characteristic graph illustrating a relationship between efficiency of a variable speed compressor and the rotation speed which are used for the simple inverter-controlled refrigerator according to the second exemplary embodiment of the present invention.

FIG. 9 is a flowchart illustrating the operation rate and an operation for determining the rotation speed in simple inverter-controlled refrigerator 50 according to the second exemplary embodiment of the present invention. FIG. 10 is a characteristic graph illustrating a relationship among the operation rate, the compressor rotation speed, and refrigerator power consumption in simple inverter-controlled refrigerator 50. FIG. 11 is a is a characteristic graph illustrating a relationship between efficiency of a variable speed compressor and the rotation speed which are used for simple inverter-controlled refrigerator 50.

Simple inverter-controlled refrigerator 50 according to the second exemplary embodiment is configured so that rotation speed setting unit 23 including operation rate calculation unit 22 of inverter control unit 14 corrects the operation rate of the refrigerator in view of the efficiency of variable speed compressor 8 and determines the rotation speed which matches the operation rate. The other configurations and control configurations of the refrigerator are the same as those according to the first exemplary embodiment, and thus, description thereof will be omitted with reference to FIGS. 1 to 5.

As illustrated in FIG. 9, similarly to the first exemplary embodiment, rotation speed setting unit 23 according to the second exemplary embodiment corrects the operation rate in view of the efficiency of variable speed compressor 8 in STEP 21 after obtaining the operation rate from the turning-on time and the turning-off time of variable speed compressor 8 in STEP 18. In STEP 19, rotation speed setting unit 23 determines the rotation speed.

Here, the correction of the operation rate which is performed by variable speed compressor 8 in view of the efficiency is obtained by (Expression 2) in the following.

Operation Rate Correction Value (%)=Operation Rate Obtained by Operation Rate Calculation (%)×Compressor Rotation Speed (rps) Obtained by Operation Rate Calculation/Rotation Speed (rps) Allowing Compressor to be Most Efficiently Operated  [Expression 2]

That is, as illustrated in FIG. 10, for example, if the operation rate which allows the refrigerator to have the least power consumption is first calculated as 70%, the rotation speed of variable speed compressor 8 in this case is 30 rps as illustrated by a horizontal axis portion of the rotation speed in FIG. 10.

However, in variable speed compressor 8, the rotation speed which allows the compressor alone to have the most improved operation efficiency is not necessarily limited to 30 rps. If the rotation speed is 25 rps as illustrated in FIG. 11, based on Expression 2 described above, the operation rate calculation unit corrects the rotation speed to 84% as the operation rate (corrected operation rate) in view of the efficiency of variable speed compressor 8 [operation rate 70%×(rotation speed 30 rps of compressor in case of operation rate 70%/rotation speed 25 rps indicating that efficiency of compressor is most improved efficiency)].

The compressor is operated at the operation rate of 84% in this way. Accordingly, as illustrated by (A) in FIG. 10, even when the refrigerator employs variable speed compressor 8 whose rotation speed is 25 rps which allows the compressor alone to have the most improved operation efficiency, as illustrated by (B) in FIG. 10, power consumption can be minimized to the same level as (B) when the refrigerator has the less power consumption while the operation rate is calculated to 70% which allows the refrigerator to have the least power consumption. That is, until the operation rate is calculated to be in the same level, it is possible to realize efficient energy saving operation.

The efficiency of variable speed compressor means a measurement value which is a representative condition for measuring the compressor, such as the Ashley condition.

An operation rate correction value described in the present exemplary embodiment represents not only a value obtained by Expression 2 above, but also a value required when the operation rate has to be corrected to the operation value which allows the refrigerator to have less power consumption than the operation rate set before being obtained from at least Expression 2 (in a case where the compressor efficiency is not considered). The operation in view of the compressor efficiency represents the operation based on this value. For example, whether or not this operation is performed can be determine by the rotation speed of the compressor.

Simple inverter-controlled refrigerator 50 operated as described above according to the second exemplary embodiment has the same advantageous effect as that of simple inverter-controlled refrigerator 50 according to the first exemplary embodiment, and further has the following advantageous effect.

That is, operation rate calculation unit 22 of inverter control unit 14 is configured to set the operation rate correction value in a form of incorporating the efficiency of variable speed compressor 8 in addition to a predetermined range operation rate. Accordingly, a target operation rate set in view of the efficiency of the compressor can be calculated from a ratio between the rotation speed which leads to a predetermined operation rate and the rotation speed which allows the compressor single body to be most efficiently operated.

Therefore, inverter control unit 14 sets the compressor rotation speed within a range where variable speed compressor 8 is most efficiently operated. Therefore, it is possible to further improve energy saving, and it is possible to realize simple inverter-controlled refrigerator whose energy saving is further improved.

Moreover, inverter control unit 14 and variable speed compressor 8 are configured to function as an integrated component or a component in paired state. Therefore, in a state where variable speed compressor 8 is always efficiently operated, the operation rate falls within the predetermined range. Accordingly, the refrigerator manufacturer does not need to carry out adjustment work between the efficiency and the operation rate of variable speed compressor 8. It is possible to reliably realize the simple inverter-controlled refrigerator which can be operated under the condition set in view of the efficiency of the compressor.

Similarly, inverter control unit 14 is configured so that operation rate calculation unit 22 sets the operation rate correction value from the predetermined range operation rate and the efficiency of variable speed compressor 8. Accordingly, in a case where inverter control unit 14 is incorporated in the refrigerator, the compressor rotation speed can be set within the range where variable speed compressor 8 is most efficiently operated. Therefore, it is possible to provide the improved energy saving refrigerator.

Inverter compressor 15 in which inverter control unit 14 and variable speed compressor 8 are integrated with each other can realize the refrigerator whose operation rate falls within the predetermined range in a state where variable speed compressor 8 is always efficiently operated. Accordingly, the refrigerator manufacturer does not need to carry out adjustment work between the efficiency and the operation rate of variable speed compressor 8. It is possible to reliably realize the simple inverter-controlled refrigerator which can be operated under the condition set in view of the efficiency of the compressor.

According to the second exemplary embodiment, inverter control unit 14 and variable speed compressor 8 are in a paired state. This means that inverter control unit 14 and variable speed compressor 8 may be a separate body and may be installed in a state of being away from each other.

Figure 12:
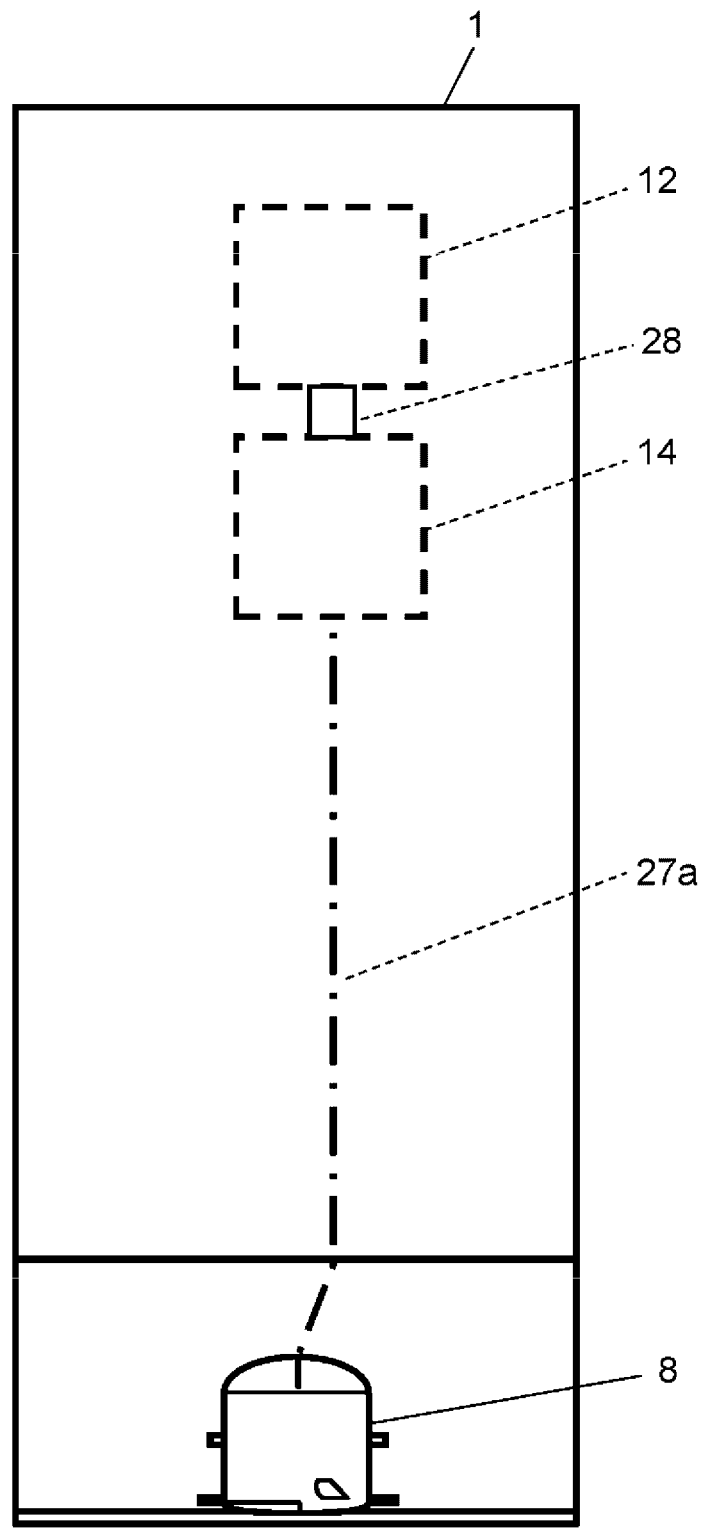
FIG. 12 is a rear view illustrating another arrangement example of the inverter control unit according to the second exemplary embodiment of the present invention.
Figure 13:
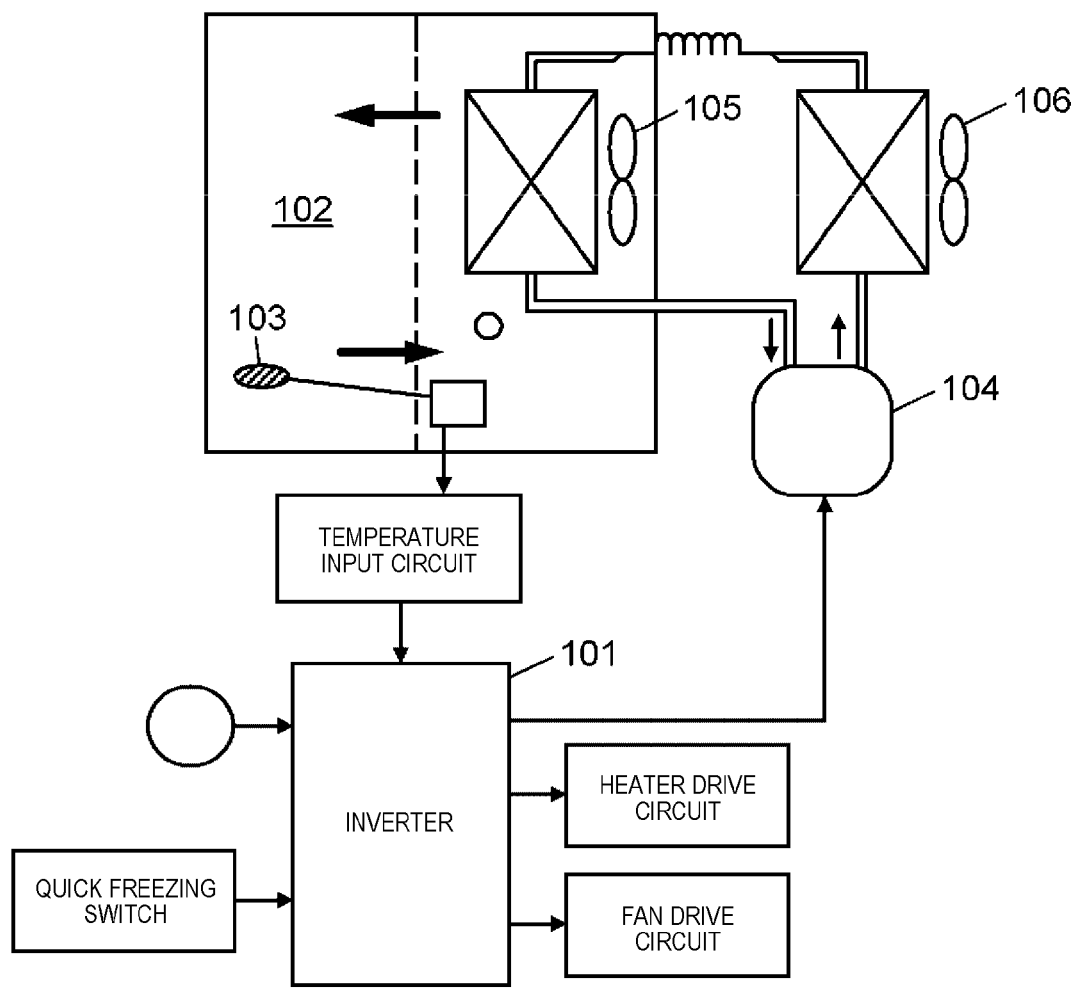
FIG. 13 is a view illustrating a configuration of a refrigerator disclosed in PTL 1 in the related art.

FIG. 12 is a rear view illustrating another arrangement example of inverter control unit 14 according to the second exemplary embodiment of the present invention.

Specifically, as illustrated in FIG. 12, inverter control unit 14 may be installed in an upper section of the refrigerator, for example, in the vicinity of constant speed main body control unit 12 in a rear surface upper portion of refrigerator main body 1. Variable speed compressor 8 may be installed in a lower section of the refrigerator, and both of these may be installed in a state of being away from each other. In this case, inverter control unit 14 is supplementarily connected to constant speed main body control unit 12 via connector 28, and is connected to variable speed compressor 8 via cable 27a.

In a case where both of these are installed in this state, the following advantageous effect can be further expected. That is, for example, in a case where the refrigerator is used in regions or countries suffering frequent damage caused by the flood (for example, tropical countries), it is possible to prevent water from entering inverter control unit 14, and it is possible to prevent inverter control unit 14 from becoming useless. In addition, even if the refrigerator is used in any region, it is possible to reduce possibilities that variable speed compressor 8 may thermally influence inverter control unit 14. Therefore, it is possible to prevent poor reliability of inverter control unit 14.

Hitherto, the simple inverter-controlled refrigerator, the refrigerator inverter control unit, and the inverter compressor using the same have been described with reference to the exemplary embodiments. However, the present invention is not limited to these examples. That is, it is to be considered that the exemplary embodiments disclosed herein are presented by way of example only at all points, and are not intended to limit the present invention. That is, the scope of the present invention is not limited to the configurations described in the exemplary embodiments. The present invention is intended to include all modifications which are disclosed in the scope of accompanying claims, within the scope and the meaning equivalent to the scope of the accompanying claims.

As described above, the simple inverter-controlled refrigerator according to a first aspect of the exemplary embodiment includes the temperature detector, and the constant speed main body control unit whose power is turned on/off by the temperature detector, and that can drive the constant speed compressor. The simple inverter-controlled refrigerator further includes the inverter control unit that is connected to the constant speed main body control unit, and that is operated, based on the power on/off signal of the constant speed main body control unit, and the variable speed compressor that is connected to the inverter control unit, and that is controlled, based on the output from the inverter control unit. The inverter control unit has the rotation speed setting unit which is operated, based on the power on/off signal of the constant speed main body control unit, and which is configured to set the rotation speed of the variable speed compressor, and the inverter drive circuit unit which drives the variable speed compressor at the rotation speed set by the rotation speed setting unit. The constant speed main body control unit and the inverter control unit are configured to function as an individually independent unit. The inverter control unit which is separate from and independent of the constant speed main body control unit is connected to the constant speed main body control unit.

In this manner, the inverter control unit and the variable speed compressor are incorporated in the constant speed refrigerator having the constant speed main body control unit which performs the constant speed control by causing the temperature detector to turn on/off the compressor. In this simple manner, the constant speed refrigerator can function as the simple inverter-controlled refrigerator. Moreover, in this case, the refrigerator main body side does not need to replace the main body control unit with the inverter control unit. Accordingly, it is possible to provide the inverter-controlled refrigerator for a refrigerator manufacturer side without requiring much trouble. That is, the refrigerator manufacturer side incorporates the inverter control unit configured so that the rotation speed setting unit and the inverter drive circuit unit function as one unit, and the variable speed compressor, or the inverter compressor in which these are integrally assembled to each other, in the refrigerator as components. In this simple manner, it is possible to realize the simple inverter-controlled refrigerator. In this way, simple inverter-controlled refrigerator can be easily, frequently, and quickly provided in response to a demand situation.

According to a second aspect, the simple inverter-controlled refrigerator further has the cooling fan. The cooling fan is configured to be driven by the constant speed main body control unit. The variable speed compressor is configured to be driven by the output from the inverter control unit. The cooling fan and the variable speed compressor are configured to be respectively and separately controlled by the constant speed main body control unit and the inverter control unit.

In this manner, it is not necessary to carry out wiring connection work so that the inverter control unit performs the turning-on/off control on the cooling fan. Therefore, the constant speed refrigerator can more easily function as the simple inverter-controlled refrigerator. Accordingly, it is possible to more easily, frequently, and quickly provide the simple inverter-controlled refrigerator.

According to a third aspect, in the first aspect or the second aspect, the inverter control unit further has the operation rate calculation unit which calculates the operation rate from the power-on time and the power-off time, based on the power on/off signal of the constant speed main body control unit. The rotation speed setting unit is configured to set the rotation speed so that the operation rate determined by the operation rate calculation unit falls within the predetermined range.

In this manner, in a case where the operation rate is lower than the predetermined operation rate, the rotation speed is controlled to be lowered. On the other hand, in a case where the operation rate is higher than the predetermined operation rate, the rotation speed is controlled to be raised. Accordingly, the compressor rotation speed is controlled within the operation rate range allowing the refrigerator to show the most improved system efficiency. Therefore, it is possible to realize the improved energy saving refrigerator.

According to a fourth aspect, in the third aspect, the operation rate calculation unit is configured to set the operation rate correction value, based on the operation rate and the efficiency of the variable speed compressor which are predetermined.

In this manner, for example, the target operation rate set is calculated from the ratio between the rotation speed which leads to the predetermined operation rate and the rotation speed which allows the compressor single body to be most efficiently operated. That is, the inverter control unit sets the compressor rotation speed within the range where the variable speed compressor is most efficiently operated. Accordingly, it is possible to realize the simple inverter-controlled refrigerator whose energy saving is still further improved.

According to a fifth aspect, in the first aspect to the fourth aspect, the rotation speed setting unit is configured to drive the variable speed compressor by accelerating the rotation speed, if the power-on time exceeds the predetermined time.

In this manner, if the cooling time during the power-on time is lengthened after exceeding the predetermined time, the cooling capacity can be increased by raising the rotation speed, and thus, it is possible to perform the quick cooling.

According to a sixth aspect, the refrigerator inverter control unit includes the power on/off detection circuit, the rotation speed setting unit that is configured to set the rotation speed, based on the power on/off signal from the power on/off detection circuit, and the inverter drive circuit unit that drives the variable speed compressor at the rotation speed set by the rotation speed setting unit. The power on/off detection circuit, the rotation speed setting unit, and the inverter drive circuit unit are configured to function as one unit, are operated when the power on/off detection circuit detects the power-on time, and are configured to drive the variable speed compressor at the rotation speed set by the rotation speed setting unit.

In this manner, if the inverter control unit detects the power on/off signal, the inverter control unit itself can set the rotation speed. Therefore, the inverter can perform variable speed control without adding the rotation speed setting function to the device body control unit side in which the inverter control unit is incorporated. Accordingly, it is possible to simply realize the simple inverter-controlled refrigerator by incorporating the inverter control unit in the refrigerator as a component.

According to a seventh aspect, in the sixth aspect, the refrigerator inverter control unit further includes the operation rate calculation unit that calculates the operation rate, based on the power on/off signal from the power on/off detection circuit. The rotation speed setting unit is configured to set the rotation speed so that the operation rate determined by the operation rate calculation unit falls within the predetermined range.

In this manner, in a case where a device in which the inverter control unit is incorporated is the refrigerator, the inverter control unit in the refrigerator controls the compressor rotation speed within the operation rate range allowing the refrigerator to show the most improved system efficiency. Accordingly, it is possible to realize the improved energy saving refrigerator.

According to an eighth aspect, in the seventh aspect, the operation rate calculation unit is configured to set the operation rate correction value, based on the operation rate and the efficiency of the variable speed compressor which are in a predetermined range.

In this manner, in a case where a device in which the inverter control unit is incorporated is the refrigerator, the compressor rotation speed is set within the operation rate range allowing the variable speed compressor of the refrigerator to show the most improved efficiency. Accordingly, it is possible to realize the further improved energy saving refrigerator.

According to a ninth aspect, in the sixth aspect to the eight aspect, the rotation speed setting unit is configured to drive the variable speed compressor by accelerating the rotation speed, if the power-on time exceeds the predetermined time.

In this manner, in a case where a device in which the inverter control unit is incorporated is the refrigerator, if the cooling time during the power-on time is lengthened after exceeding the predetermined time, the cooling capacity can be increased by raising the rotation speed, and thus, it is possible to perform the quick cooling.

According to a tenth aspect, in the sixth aspect to the ninth aspect, the rotation speed setting unit is configured to drive the variable speed compressor by setting the predetermined or faster rotation speed used during the fixed time from the power-on time.

In this manner, in a case where a device in which the inverter control unit is incorporated is the refrigerator, when the refrigerator starts to be used and when the operation restarts after the defrosting operation, the refrigerator can be cooled at the rotation speed which is equal to or faster than the predetermined rotation speed, for example, at the fastest rotation speed, and thus, it is possible to perform the quick cooling.

According to an eleventh aspect, there is provided the inverter compressor configured so that the refrigerator inverter control unit of any one of the sixth aspect to the tenth aspect is integrated with the variable speed compressor.

In this manner, the inverter compressor functions as one component in which the inverter control unit and the variable speed compressor are paired. Accordingly, these can be compactly assembled to each other. The refrigerator manufacturer may directly incorporate these in the refrigerator. Accordingly, it is possible to more easily and quickly realize the simple inverter-controlled refrigerator. Moreover, the inverter control unit and the variable speed compressor can be used in a form of the rotation speed set in the range where the variable speed compressor is always most efficiently operated. Therefore, a device using these components can show the most improved energy saving performance.

INDUSTRIAL APPLICABILITY

As described above, according to the present invention, there are special advantageous effects in that it is possible to easily manufacture an inverter-controlled refrigerator, and in that it is possible to frequently and quickly provide a simple inverter-controlled refrigerator which can be inexpensively manufactured in response to a demand situation. Therefore, the present invention is advantageously applied to the simple inverter-controlled refrigerator, the refrigerator inverter control unit, and the inverter compressor using the same.

REFERENCE MARKS IN THE DRAWINGS

1 REFRIGERATOR MAIN BODY
2 REFRIGERATOR COMPARTMENT
3 FREEZER COMPARTMENT
4 SHELF BOARD
5 FREEZER COMPARTMENT CASE
6, 7 DOOR
8 VARIABLE SPEED COMPRESSOR
9 COOLER
10 COOLING FAN
11 DEFROSTING HEATER
12 CONSTANT SPEED MAIN BODY CONTROL UNIT
14 INVERTER CONTROL UNIT
15 INVERTER COMPRESSOR
16 COMMERCIAL POWER SOURCE
17 TEMPERATURE DETECTOR
18 DEFROSTING TIMER
18$a$ NORMALLY OPEN CONTACT
18$b$ NORMALLY CLOSED CONTACT
19 BIMETAL SWITCH
20 ON/OFF OUTPUT UNIT
21 POWER ON/OFF DETECTION CIRCUIT
22 OPERATION RATE CALCULATION UNIT
23 ROTATION SPEED SETTING UNIT
24 INVERTER DRIVE CIRCUIT UNIT
25 CONNECTOR
26 PHOTO-COUPLER
27, 27$a$ CABLE
28 CONNECTOR
50 SIMPLE INVERTER-CONTROLLED REFRIGERATOR

The invention claimed is:

1. A simple inverter-controlled refrigerator comprising:
a temperature detector;
a constant speed main body control unit whose power is turned on/off by the temperature detector, and that can drive a constant speed compressor;
an inverter control unit that is connected to the constant speed main body control unit, and that is operated, based on a power on/off signal that includes a commercial power source voltage current output for driving a constant speed compressor; and
a variable speed compressor that is driven at a variable speed, is connected to the inverter control unit, and is controlled, based on an output from the inverter control unit,
wherein the constant speed main body control unit includes an on/off output unit connected to the inverter control unit and outputting the power on/off signal-including the commercial power source voltage current output for driving a constant speed compressor,
wherein the inverter control unit has
a power on/off detection circuit connected to the on/off output unit of the constant speed main body control unit and detecting the power on/off signal outputted from the on/off output unit, and
a rotation speed setting unit which is operated, based on the power on/off signal, detected by the power on/off detection circuit, from the constant speed main body control unit, and which is configured to set a rotation speed of the variable speed compressor, and an inverter drive circuit unit which drives the variable speed compressor at the rotation speed set by the rotation speed setting unit,
wherein the constant speed main body control unit and the inverter control unit are configured to function as an individually independent unit, and
wherein the inverter control unit is separate from and independent of the constant speed main body control unit and is connected to the constant speed main body control unit.

2. The simple inverter-controlled refrigerator of claim 1, further comprising:
a cooling fan,
wherein the cooling fan is configured to be driven by the constant speed main body control unit,
wherein the variable speed compressor is configured to be driven by an output from the inverter control unit, and
wherein the cooling fan and the variable speed compressor are configured to be respectively and separately controlled by the constant speed main body control unit and the inverter control unit.

3. The simple inverter-controlled refrigerator of claim 1, wherein the inverter control unit further has an operation rate calculation unit which calculates an operation rate from a power-on time and a power-off time, based on the power on/off signal of the constant speed main body control unit, and
wherein the rotation speed setting unit is configured to set so that the operation rate determined by the operation rate calculation unit falls within a predetermined range.

4. The simple inverter-controlled refrigerator of claim 2, wherein the inverter control unit further has an operation rate calculation unit which calculates an operation rate from a power-on time and a power-off time, based on the power on/off signal of the constant speed main body control unit, and
wherein the rotation speed setting unit is configured to set so that the operation rate determined by the operation rate calculation unit falls within a predetermined range.

5. The simple inverter-controlled refrigerator of claim 3, wherein the operation rate calculation unit is configured to set an operation rate correction value, based on the operation rate and efficiency of the variable speed compressor which are predetermined.

6. The simple inverter-controlled refrigerator of claim 4, wherein the operation rate calculation unit is configured to set an operation rate correction value, based on the operation rate and efficiency of the variable speed compressor which are predetermined.

7. The simple inverter-controlled refrigerator of claim 1, wherein the rotation speed setting unit is configured to drive the variable speed compressor by accelerating the rotation speed, if the power-on time exceeds a predetermined time.

8. The simple inverter-controlled refrigerator of claim 2, wherein the rotation speed setting unit is configured to drive the variable speed compressor by accelerating the rotation speed, if the power-on time exceeds a predetermined time.

9. The simple inverter-controlled refrigerator of claim 3, wherein the rotation speed setting unit is configured to drive the variable speed compressor by accelerating the rotation speed, if the power-on time exceeds a predetermined time.

10. The simple inverter-controlled refrigerator of claim 4, wherein the rotation speed setting unit is configured to drive the variable speed compressor by accelerating the rotation speed, if the power-on time exceeds a predetermined time.

11. The simple inverter-controlled refrigerator of claim 5, wherein the rotation speed setting unit is configured to drive the variable speed compressor by accelerating the rotation speed, if the power-on time exceeds a predetermined time.

12. The simple inverter-controlled refrigerator of claim 6, wherein the rotation speed setting unit is configured to drive the variable speed compressor by accelerating the rotation speed, if the power-on time exceeds a predetermined time.

13. A refrigerator inverter control unit comprising:
a power on/off detection circuit that is configured to detect a power on/off signal outputted from an on/off output unit of a constant speed main body control unit, the power on/off signal including a commercial power source voltage current output for driving a constant speed compressor;
a rotation speed setting unit that is operated, based on the power on/off signal, detected by the power on/off detection circuit from the constant speed main body control unit and is configured to set a rotation speed, based on the power on/off signal detected by the power on/off detection circuit; and
an inverter drive circuit unit that drives a variable speed compressor at the rotation speed set by the rotation speed setting unit,
wherein the power on/off detection circuit, the rotation speed setting unit, and the inverter drive circuit unit are configured to function as one unit, are operated when the power on/off detection circuit detects a power-on time, and are configured to drive the variable speed compressor at the rotation speed set by the rotation speed setting unit, and wherein the rotation speed setting unit is configured to drive the variable speed compressor by setting a predetermined or faster rotation speed used during a fixed time from the power-on time.

14. The refrigerator inverter control unit of claim 13, further comprising:
an operation rate calculation unit that calculates an operation rate, based on the power on/off signal from the power on/off detection circuit,
wherein the rotation speed setting unit is configured to set the rotation speed so that the operation rate determined by the operation rate calculation unit falls within a predetermined range.

15. The refrigerator inverter control unit of claim 14, wherein the operation rate calculation unit is configured to set an operation rate correction value, based on the operation rate and efficiency of the variable speed compressor which are in a predetermined range.

16. The refrigerator inverter control unit of claim 13, wherein the rotation speed setting unit is configured to drive the variable speed compressor by accelerating the rotation speed, if the power-on time exceeds a predetermined time.

17. The refrigerator inverter control unit of claim 14, wherein the rotation speed setting unit is configured to drive the variable speed compressor by accelerating the rotation speed, if the power-on time exceeds a predetermined time.

18. The refrigerator inverter control unit of claim 15, wherein the rotation speed setting unit is configured to drive the variable speed compressor by accelerating the rotation speed, if the power-on time exceeds a predetermined time.

19. An apparatus comprising a refrigerator inverter control unit and a variable speed compressor, the refrigerator inverter control unit comprising:
a power on/off detection circuit that is configured to detect a power on/off signal outputted from an on/off output unit of a constant speed main body control unit, the power on/off signal including a commercial power source voltage current output for driving a constant speed compressor;
a rotation speed setting unit that is operated, based on the power on/off signal, detected by the power on/off detection circuit from the constant speed main body control unit and is configured to set a rotation speed, based on the power on/off signal detected by the power on/off detection circuit; and
an inverter drive circuit unit that drives a variable speed compressor at the rotation speed set by the rotation speed setting unit,
wherein the power on/off detection circuit, the rotation speed setting unit, and the inverter drive circuit unit are configured to function as one unit, are operated when the power on/off detection circuit detects a power-on time, and are configured to drive the variable speed compressor at the rotation speed set by the rotation speed setting unit, and
wherein the rotation speed setting unit is configured to drive the variable speed compressor by setting a predetermined or faster rotation speed used during a fixed time from the power-on time, and
wherein the refrigerator inverter control unit and the variable speed compressor are integrated with each other.

20. The apparatus of claim 19, the refrigerator inverter control unit further comprising:
an operation rate calculation unit that calculates an operation rate, based on the power on/off signal from the power on/off detection circuit,
wherein the rotation speed setting unit is configured to set the rotation speed so that the operation rate determined by the operation rate calculation unit falls within a predetermined range.

21. The apparatus of claim 20, wherein the operation rate calculation unit is configured to set an operation rate correction value, based on the operation rate and efficiency of the variable speed compressor, which are in a predetermined range.

22. The apparatus of claim 19, wherein the rotation speed setting unit is configured to drive the variable speed compressor by accelerating the rotation speed, if the power-on time exceeds a predetermined time.

23. The apparatus of claim 20, wherein the rotation speed setting unit is configured to drive the variable speed compressor by accelerating the rotation speed, if the power-on time exceeds a predetermined time.

24. The apparatus of claim 21, wherein the rotation speed setting unit is configured to drive the variable speed compressor by accelerating the rotation speed, if the power-on time exceeds a predetermined time.

* * * * *